(12) United States Patent
Schiffmann et al.

(10) Patent No.: US 7,899,821 B1
(45) Date of Patent: Mar. 1, 2011

(54) MANIPULATION AND/OR ANALYSIS OF HIERARCHICAL DATA

(76) Inventors: Karl Schiffmann, Santa Barbara, CA (US); Jack J. LeTourneau, Carpenteria, CA (US); Mark Andrews, Orinda, CA (US)

( * ) Notice: Subject to any disclaimer, the term of this patent is extended or adjusted under 35 U.S.C. 154(b) by 116 days.

(21) Appl. No.: 11/412,417

(22) Filed: Apr. 26, 2006

Related U.S. Application Data

(60) Provisional application No. 60/675,987, filed on Apr. 29, 2005.

(51) Int. Cl.
G06F 17/30 (2006.01)
G06F 17/20 (2006.01)

(52) U.S. Cl. .......................... 707/736; 715/234

(58) Field of Classification Search .............. 707/6
See application file for complete search history.

(56) References Cited

U.S. PATENT DOCUMENTS

| | | | |
|---|---|---|---|
| 3,201,701 A | 8/1965 | Maitra | |
| 4,156,910 A | 5/1979 | Barton et al. | |
| 4,745,561 A | 5/1988 | Hirosawa et al. | |
| 4,751,684 A | 6/1988 | Holt | |
| 4,831,525 A | 5/1989 | Saito et al. | |
| 4,905,138 A | 2/1990 | Bourne | |
| 4,931,928 A | 6/1990 | Greenfeld | |
| 4,949,388 A * | 8/1990 | Bhaskaran | 382/159 |
| 4,989,132 A | 1/1991 | Mellender et al. | |
| 4,991,087 A | 2/1991 | Burkowski et al. | |
| 5,021,943 A | 6/1991 | Grimes | |
| 5,021,992 A | 6/1991 | Kondo | |
| 5,191,522 A | 3/1993 | Bosco et al. | |
| 5,235,701 A | 8/1993 | Ohler et al. | |
| 5,265,245 A | 11/1993 | Norstrom et al. | |
| 5,295,261 A | 3/1994 | Simonetti | |
| 5,335,345 A | 8/1994 | Frieder et al. | |
| 5,463,777 A | 10/1995 | Bialkowski et al. | |
| 5,493,504 A | 2/1996 | Minato | |
| 5,497,500 A | 3/1996 | Rogers et al. | |
| 5,509,088 A | 4/1996 | Robson | |
| 5,519,627 A | 5/1996 | Mahmood et al. | |
| 5,522,068 A | 5/1996 | Berkowitz | |
| 5,598,350 A * | 1/1997 | Kawanishi et al. | 702/20 |
| 5,606,669 A | 2/1997 | Bertin et al. | |
| 5,687,362 A | 11/1997 | Bhargava et al. | |
| 5,724,512 A | 3/1998 | Winterbottom | |
| 5,724,576 A | 3/1998 | LeTourneau | |
| 5,758,152 A | 5/1998 | LeTourneau | |
| 5,781,906 A | 7/1998 | Aggarwal et al. | |

(Continued)

OTHER PUBLICATIONS

Paula Leinonen, "Automation of Document Structure Transformations", Nov. 23, 2004.*

(Continued)

*Primary Examiner* — Neveen Abel Jalil
*Assistant Examiner* — Tarek Chbouki
(74) *Attorney, Agent, or Firm* — Berkeley Law & Technology Group, LLP

(57) ABSTRACT

Embodiments of methods, apparatuses, devices and/or systems for manipulating hierarchical sets of data are disclosed. In particular, methods, apparatus devices and or/or systems for analyzing hierarchical data are disclosed. In a particular example, rooted partial subtrees of partial subtrees of a tree are enumerated and associated with target numerals according to an association of trees and numerals. A probe numeral, representing information of interest, may be compared with target numerals to find a match. In one particular example, such a match indicates a presence of particular information in the tree.

39 Claims, 21 Drawing Sheets

U.S. PATENT DOCUMENTS

| | | | |
|---|---|---|---|
| 5,787,415 A | 7/1998 | Jacobson et al. | |
| 5,787,432 A | 7/1998 | LeTourneau | |
| 5,796,356 A | 8/1998 | Okada et al. | |
| 5,822,593 A | 10/1998 | Lamping et al. | |
| 5,848,159 A | 12/1998 | Collins et al. | |
| 5,930,805 A | 7/1999 | Marquis | |
| 5,978,790 A | 11/1999 | Buneman et al. | |
| 5,987,790 A | 11/1999 | Buneman et al. | |
| 5,999,926 A | 12/1999 | Suciu | |
| 6,002,879 A | 12/1999 | Radigan et al. | |
| 6,022,879 A | 2/2000 | Crow et al. | |
| 6,055,537 A | 4/2000 | LeTourneau | |
| 6,088,691 A | 7/2000 | Bhargava et al. | |
| 6,141,655 A | 10/2000 | Johnson et al. | |
| 6,199,103 B1 | 3/2001 | Sakaguchi | |
| 6,236,410 B1 | 5/2001 | Politis et al. | |
| 6,289,354 B1 | 9/2001 | Aggarwal et al. | |
| 6,292,938 B1 | 9/2001 | Sarkar et al. | |
| 6,442,584 B1 | 8/2002 | Kolli et al. | |
| 6,505,205 B1 | 1/2003 | Kothuri et al. | |
| 6,542,899 B1 | 4/2003 | Saulpaugh et al. | |
| 6,550,024 B1 | 4/2003 | Pagurek et al. | |
| 6,556,983 B1 | 4/2003 | Altschuler et al. | |
| 6,598,052 B1 | 7/2003 | Saulpaugh et al. | |
| 6,606,632 B1 | 8/2003 | Saulpaugh et al. | |
| 6,609,130 B1 | 8/2003 | Saulpaugh et al. | |
| 6,611,844 B1 | 8/2003 | Saulpaugh et al. | |
| 6,658,649 B1 | 12/2003 | Bates et al. | |
| 6,714,939 B2 | 3/2004 | Saldanha et al. | |
| 6,745,384 B1 | 6/2004 | Biggerstaff | |
| 6,748,378 B1 | 6/2004 | Lavender et al. | |
| 6,763,515 B1 | 7/2004 | Vazquez et al. | |
| 6,785,673 B1 | 8/2004 | Fernandez et al. | |
| 6,847,979 B2 | 1/2005 | Allemang et al. | |
| 6,874,005 B2 | 3/2005 | Fortenberry et al. | |
| 6,965,990 B2 | 11/2005 | Barsness et al. | |
| 6,968,330 B2 | 11/2005 | Edwards et al. | |
| 7,043,555 B1* | 5/2006 | McClain et al. | 709/229 |
| 7,051,033 B2 | 5/2006 | Agarwal et al. | |
| 7,072,904 B2 | 7/2006 | Najork et al. | |
| 7,103,838 B1* | 9/2006 | Krishnamurthy et al. | 715/202 |
| 7,140,006 B2 | 11/2006 | Harrison et al. | |
| 7,162,485 B2 | 1/2007 | Gottlob et al. | |
| 7,191,182 B2 | 3/2007 | Anonsen et al. | |
| 7,203,774 B1 | 4/2007 | Zhou et al. | |
| 7,287,026 B2 | 10/2007 | Oommen | |
| 7,313,563 B2* | 12/2007 | Bordawekar et al. | 707/101 |
| 7,318,215 B1 | 1/2008 | Krishnan et al. | |
| 7,356,802 B2 | 4/2008 | de Sutter et al. | |
| 7,360,202 B1 | 4/2008 | Seshadri et al. | |
| 7,475,070 B2* | 1/2009 | Fan et al. | 1/1 |
| 7,512,932 B2 | 3/2009 | Davidov et al. | |
| 7,561,927 B2 | 7/2009 | Oyama et al. | |
| 7,620,632 B2 | 11/2009 | Andrews | |
| 7,627,591 B2 | 12/2009 | LeTourneau | |
| 7,630,995 B2 | 12/2009 | LeTourneau | |
| 7,636,727 B2 | 12/2009 | Schiffmann et al. | |
| 7,681,177 B2 | 3/2010 | LeTourneau | |
| 7,801,923 B2 | 9/2010 | LeTourneau | |
| 2001/0003211 A1 | 6/2001 | Bera | |
| 2002/0040292 A1 | 4/2002 | Marcu | |
| 2002/0059281 A1 | 5/2002 | Watanabe et al. | |
| 2002/0062259 A1* | 5/2002 | Katz et al. | 705/26 |
| 2002/0129129 A1* | 9/2002 | Bloch et al. | 709/220 |
| 2002/0133497 A1 | 9/2002 | Draper et al. | |
| 2002/0149604 A1 | 10/2002 | Wilkinson | |
| 2002/0169563 A1 | 11/2002 | de Carvalho Ferreira | |
| 2003/0041088 A1 | 2/2003 | Wilson et al. | |
| 2003/0065659 A1 | 4/2003 | Agarwal et al. | |
| 2003/0115559 A1 | 6/2003 | Sawada | |
| 2003/0130977 A1* | 7/2003 | Oommen | 706/59 |
| 2003/0167445 A1 | 9/2003 | Su et al. | |
| 2003/0195885 A1 | 10/2003 | Emmick et al. | |
| 2003/0195890 A1 | 10/2003 | Oommen | |
| 2003/0236794 A1 | 12/2003 | Hostetter et al. | |
| 2004/0010752 A1* | 1/2004 | Chan et al. | 715/513 |
| 2004/0060007 A1* | 3/2004 | Gottlob et al. | 715/513 |
| 2004/0068498 A1* | 4/2004 | Patchet et al. | 707/6 |
| 2004/0103105 A1* | 5/2004 | Lindblad et al. | 707/100 |
| 2004/0205047 A1* | 10/2004 | Carpenter | 707/3 |
| 2004/0215642 A1 | 10/2004 | Cameron et al. | |
| 2004/0239674 A1 | 12/2004 | Ewald et al. | |
| 2004/0254909 A1 | 12/2004 | Testa | |
| 2004/0260683 A1 | 12/2004 | Chan et al. | |
| 2005/0021548 A1* | 1/2005 | Bohannon et al. | 707/101 |
| 2005/0023524 A1 | 2/2005 | Beatty | |
| 2005/0027743 A1 | 2/2005 | O'Neil et al. | |
| 2005/0050066 A1* | 3/2005 | Hughes | 707/100 |
| 2005/0058976 A1 | 3/2005 | Vernon | |
| 2005/0060332 A1 | 3/2005 | Bernstein et al. | |
| 2005/0065964 A1 | 3/2005 | Ziemann et al. | |
| 2005/0125432 A1 | 6/2005 | Lin et al. | |
| 2005/0154265 A1* | 7/2005 | Miro et al. | 600/300 |
| 2005/0165732 A1 | 7/2005 | Burgess | |
| 2005/0187900 A1 | 8/2005 | LeTourneau | |
| 2005/0267908 A1 | 12/2005 | LeTourneau | |
| 2006/0004817 A1* | 1/2006 | Andrews | 707/101 |
| 2006/0015538 A1 | 1/2006 | LeTourneau | |
| 2006/0053122 A1* | 3/2006 | Korn et al. | 707/100 |
| 2006/0095442 A1 | 5/2006 | LeTourneau | |
| 2006/0095455 A1 | 5/2006 | LeTourneau | |
| 2006/0123029 A1 | 6/2006 | LeTourneau | |
| 2006/0129582 A1* | 6/2006 | Schiffmann et al. | 707/101 |
| 2006/0209351 A1* | 9/2006 | Saito | 358/3.28 |
| 2006/0259533 A1 | 11/2006 | LeTourneau | |
| 2006/0271573 A1* | 11/2006 | LeTourneau | 707/100 |
| 2007/0198538 A1 | 8/2007 | Palacios | |
| 2010/0094908 A1 | 4/2010 | LeTourneau | |
| 2010/0191775 A1 | 7/2010 | Schiffmann et al. | |
| 2010/0205581 A1 | 8/2010 | LeTourneau | |

OTHER PUBLICATIONS

Ionut Iacob, Alex Dekhtyar, Wenzhong Zhao, "XPath Extension for Querying Concurrent XML Markup", Mar. 6, 2004.*
Kristina Lerman, Steven Minton, "Learning the Common Structure of Data", Apr. 13, 2000.*
"Core Technology Benchmarks A White Paper", Jul. 2002, downloaded from the internet Mar. 2, 2004.
"Origin Data, Inc. White Paper", pp. 1-13.
"The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
"The Associative Model of Data White Paper", Lazy Software, 2000.
Apostol, "A Centennial History of the Prime No. Theorem", Engineering and Science, No. 4, 1996.
Cano et al., "Lazy Evaluation in Penniless Propagation over Join Trees", Networks, vol. 39(4), 175-185, 2002.
Cooper et al., "*Oh! Pascal!*", 1982, pp. 295-327.
Er, M.C., "Enumerating Ordered Trees Lexicographically", Computation Journal, vol. 28, Issue 5, pp. 538-542, 1985.
Hoffman et al., "Pattern Matching in Trees", Jan. 1982, ACM Press, vol. 29, Issue 1, pp. 68-95.
Kharbutli et al., "Using Prime Numbers for Cache Indexing to Eliminate Conflict Misses", 24 pages.
Kilpelainen, "Tree Matching Problems with Applications to Structured Text Databases", Ph.D. Dissertation, Department of Computer Science, University of Helsinki, Report A-1992-6, Helsinki, Finland, pp. 1-109, Nov. 1992.
Letourneau, "The Elementary Theory of Object Oriented Arithmetic", pp. 1-9, Apr. 1990.
Neven, Frank and Thomas Schwentick, "Expressive and efficient pattern languages for tree-structured data" Proceedings of the Nineteenth ACM Sigact-Sigmod-Sigart Symposium on Principles of Database Systems, May 2000.

Sechrest et al., "Blending Hierarchical and Attribute-Based File Naming", Distributed Computing System, 1992., Proceedings of the 12$^{th}$ International Conference on Jun. 9-12, 1992, pp. 572-580.

Shanmugasundaram et al., "Querying SML Views of Relational Data", Proceedings of the 27$^{th}$ VLDB Conference, Roma, Italy, 2001.

Sitaraman, Krishna, Ranganathan, N., and Ejnioui, Abdel, "A VLSI Architecture for Object Recognition using Tree Matching" Proceedings of the IEEE International Conference on Application-Specific Systems, Architectures, and Processors (ASAP'02) 2000.

Smorynski, Craig, "Logical Number Theory I: An Introduction", Springer-Verlag, 1991, pp, 14-23, and 305.

Somani et al., "Phased-Mission System Analysis Using Boolean Algebraic Methods", May 1994, ACM Press, vol. 22, Issue 1.

Stanat, D.F., and McAllister, D.F., "Discrete Mathematics in Computer Science", Prentice-Hall, 1977, Section 3.2, Trees, p. 131-145.

Valiente, "Algorithms on Trees and Graphs", pp. 151-251, Springer 2002.

Valiente, Gabriel, Chapter 4, "Tree Isomorphism," of Algorithms on Trees and Graphs, published by Springer, 2002.

Zaks, S., "Lexicographic Generation of Ordered Trees", The Journal of Theoretical Computer Science, vol. 10(1), pp. 63-82, 1980.

Office action: Restriction Requirement in co-pending U.S. Appl. No. 11/005,859, dated Dec. 12, 2007.

Response to Restriction Requirement in co-pending U.S. Appl. No. 11/005,859, dated Jan. 14, 2008.

Non-Final OA in co-pending U.S. Appl. No. 11/005,859, dated Mar. 21, 2008.

Preliminary Amendment in co-pending U.S. Appl. No. 11/007,139, dated Apr. 28, 2005.

Non-Final OA issued in co-pending U.S. Appl. No. 11/007,139 dated May 14, 2007.

Response to Non-Final OA in co-pending U.S. Appl. No. 11/007,139 dated Oct. 15, 2007.

Supplemental Amendment in co-pending U.S. Appl. No. 11/007,139 dated Oct. 17, 2007.

Non-Final OA issued in co-pending U.S. Appl. No. 11/007,139 dated Jan. 2, 2008.

Response to Non-Final OA in co-pending U.S. Appl. No. 11/007,139 dated Apr. 8, 2008.

Office action: Restriction Requirement in co-pending U.S. Appl. No. 11/006,320 dated Mar. 26, 2007.

Response to Restriction Requirement in co-pending U.S. Appl. No. 11/006,320, dated Apr. 27, 2007.

Notice of Non-Compliant Amendment in co-pending U.S. Appl. No. 11/006,320, dated Jul. 6, 2007.

Response to Notice of Non-Compliant Amendment in co-pending U.S. Appl. No. 11/006,320, dated Jul. 25, 2007.

Non-Final OA issued in co-pending U.S. Appl. No. 11/006,320 dated Oct. 1, 2007.

Response to Non-Final OA in co-pending U.S. Appl. No. 11/006,320 dated Jan. 29, 2008.

Notice of Non-Compliant Amendment in co-pending U.S. Appl. No. 11/006,320 dated Apr. 8, 2008.

Non-Final OA issued in co-pending U.S. Appl. No. 11/006,848 dated Apr. 4, 2007.

Response to Non-Final OA in co-pending U.S. Appl. No. 11/006,848, dated Oct. 3, 2007.

Supplemental Amendment in co-pending U.S. Appl. No. 11/006,848, dated Nov. 13, 2007.

Non-Final OA issued in co-pending U.S. Appl. No. 11/006,848 dated Feb. 5, 2008.

Non-Final OA issued in co-pending U.S. Appl. No. 11/006,841, dated Apr. 6, 2007.

Response to Non-Final OA in co-pending U.S. Appl. No. 11/006,841, dated Sep. 6, 2007.

Office Action: Restriction Requirement in co-pending U.S. Appl. No. 11/006,841, dated Nov. 27, 2007.

Response to Restriction Requirement in co-pending U.S. Appl. No. 11/006,841, dated Dec. 27, 2007.

Office Action: Restriction Requirement in co-pending U.S. Appl. No. 11/006,841, dated Mar. 17, 2008.

Preliminary Amendment in co-pending U.S. Appl. No. 11/006,440 dated Apr. 28, 2005.

Preliminary Amendment and Substitute Specification in co-pending U.S. Appl. No. 11/006,440 dated Oct. 5, 2006.

Office Action: Restriction Requirement in co-pending U.S. Appl. No. 11/006,440 dated Mar. 29, 2007.

Response to Restriction Requirement in co-pending U.S. Appl. No. 11/006,440 dated May 1, 2007.

Non-Final OA issued in co-pending U.S. Appl. No. 11/006,440 dated Jun. 21, 2007.

Response to Non-Final OA in co-pending U.S. Appl. No. 11/006,440 dated Nov. 20, 2007.

Final OA issued in co-pending U.S. Appl. No. 11/006,440 dated Feb. 6, 2008.

Response to Final OA in co-pending U.S. Appl. No. 11/006,440 dated Apr. 7, 2008.

Preliminary Amendment in co-pending U.S. Appl. No. 11/006,446, dated Apr. 28, 2005.

Office Action: Restriction Requirement in co-pending U.S. Appl. No. 11/006,446, dated Apr. 4, 2007.

Response to Restriction Requirement in co-pending U.S. Appl. No. 11/006,446, dated May 3, 2007.

Non-Final OA issued in co-pending U.S. Appl. No. 11/006,446, dated Jul. 26, 2007.

Response to Non-Final OA in co-pending U.S. Appl. No. 11/006,446, dated Nov. 26, 2007.

Non-Final OA issued in co-pending U.S. Appl. No. 11/006,446, dated Feb. 20, 2008.

Office Action: Restriction Requirement in co-pending U.S. Appl. No. 11/006,842, dated Jan. 23, 2008.

Response to Restriction Requirement in co-pending U.S. Appl. No. 11/006,842, dated Feb. 25, 2008.

Co-pending U.S. Appl. No. 11/319,758, filed Dec. 2005.

Co-pending U.S. Appl. No. 11/320,538, filed Dec. 2005.

Co-pending U.S. Appl. No. 11/480,094, filed Jun. 2006.

Response to Notice of Non-Compliant Amendment in co-pending U.S. Appl. No. 11/006,320 dated May 5, 2008.

Advisory Action issued in co-pending U.S. Appl. No. 11/006,440 dated May 9, 2008.

Non-Final OA issued in co-pending U.S. Appl. No. 11/385,257 dated Apr. 29, 2008.

Preliminary Amendment in co-pending U.S. Appl. No. 11/005,859, dated May 2, 2005.

Preliminary Amendment in co-pending U.S. Appl. No. 11/006,320 dated May 9, 2005.

Preliminary Amendment in co-pending U.S. Appl. No. 11/006,848, dated May 3, 2005.

ACM Portal Search Results (Kleene and prime and enumeration and operation and natural and numerals and sequences and "enumeration operation") conducted by Examiner on Jul. 18, 2009, 6 pages.

ACM Portal Search Results (Kleene and prime and enumeration and operation and natural and numerals and sequences and enumeration and operation) conducted by Examiner on Jul. 18, 2009, 1 page.

Google Search (Kleene prime enumeration operation) conducted by. Examiner on Jul. 18, 2009, 2 pages.

Google search (Kleene prime enumeration operation natural numerals sequences "Kleene prime") conducted by Examiner on Jul. 18, 2009, 2 pages.

Google Search (Kleene prime enumeration operation natural numerals sequences "enumeration operation") conducted by Examiner on Jul. 18, 2009, 2 pages.

IEEE Explore Digital Library Search Result conducted by Examiner on Jul. 18, 2009, 1 page.

Wu, "A Prime Number Labeling Scheme for Dynamic Ordered XML Trees", IEEE, 2004, 13 pages.

Response filed Jul. 21, 2008 in co-pending U.S. Appl. No. 11/005,859, 86 pages.

Final Office Action mailed Oct. 30, 2008 in co-pending U.S. Appl. No. 11/005,859, 14 pages.

Response filed Dec. 30, 2008 in co-pending U.S. Appl. No. 11/005,859, 82 pages.

Advisory Action mailed Jan. 13, 2009 in co-pending U.S. Appl. No. 11/005,859, 3 pages.

RCE and Amendment filed Apr. 30, 2009 in co-pending U.S. Appl. No. 11/005,859, 86 pages.

Final Office action mailed Jul. 8, 2009 in co-pending U.S. Appl. No. 11/005,859, 8 pages.
Final Office action mailed Aug. 15, 2008 in co-pending U.S. Appl. No. 11/007,139, 22 pages.
Response filed Oct. 15, 2008 in co-pending U.S. Appl. No. 11/007,139, 23 pages.
Advisory action mailed Oct. 22, 2008 in co-pending U.S. Appl. No. 11/007,139, 26 pages.
RCE and Amendment filed Nov. 14, 2008 in co-pending U.S. Appl. No. 11/007,139, 27 pages.
Office action mailed Dec. 8, 2008 in co-pending U.S. Appl. No. 11/007,139, 17 pages.
Amendment filed May 8, 2009 in co-pending U.S. Appl. No. 11/007,139, 26 pages.
Final Office action mailed Aug. 4, 2009 in co-pending U.S. Appl. No. 11/007,139, 18 pages.
Non-Final OA. mailed Aug. 15, 2008 in co-pending U.S. Appl. No. 11/006,320, 19 pages.
Response to Non-Final OA filed Nov. 14, 2008 in co-pending U.S. Appl. No. 11/006,320, 37 pages.
Notice of Non-Compliant Amendment mailed Jan. 27, 2009 in co-pending U.S. Appl. No. 11/006,320, 2 pages.
Amendment filed Apr. 27, 2009 in co-pending U.S. Appl. No. 11/006,320, 39 pages.
Final Office action mailed Jul. 29, 2009 in co-pending U.S. Appl. No. 11/006,320, 7 pages.
Response filed Aug. 4, 2008 in co-pending U.S. Appl. No. 11/006,848, 27 pages.
Final Office action mailed Dec. 2, 2008 in co-pending U.S. Appl. No. 11/006,848, 30 pages.
RCE and Amendment filed May 4, 2009 in co-pending U.S. Appl. No. 11/006,848, 24 pages.
Notice of Allowance mailed Jun. 11, 2009 in co-pending U.S. Appl. No. 11/006,848, 8 pages.
Issue Fee filed Sep. 11, 2009 in co-pending U.S. Appl. No. 11/006,848, 10 pages.
Response to Restriction Requirement filed Jul. 17, 2008 in co-pending U.S. Appl. No. 11/006,841, 33 pages.
Final Office Action, mailed Oct. 29, 2008 in co-pending U.S. Appl. No. 11/006,841, 54 pages.
Response filed Dec. 29, 2008 in co-pending U.S. Appl. No. 11/006,841, 45 pages.
Advisory Action mailed Jan. 6, 2009 in co-pending U.S. Appl. No. 11/006,841, 3 pages.
RCE and Amendment filed Apr. 23, 2009 in co-pending U.S. Appl. No. 11/006,841, 48 pages.
Supplemental Response filed Jun. 26, 2009 in co-pending U.S. Appl. No. 11/006,841, 34 pages.
Notice of Allowance mailed Jun. 29, 2009 in co-pending U.S. Appl. No. 11/006,841, 40 pages.
Issue Fee filed Sep. 29, 2009 in co-pending U.S. Appl. No. 11/006,841, 4 pages.
Notice of Appeal filed Aug. 4, 2008 in co-pending U.S. Appl. No. 11/006,440, 1 page.
Final Office action mailed Jan. 23, 2009 in co-pending U.S. Appl. No. 11/006,440, 22 pages.
RCE and Amendment filed Nov. 4, 2008 in co-pending U.S. Appl. No. 11/006,440, 39 pages.
Amendment After Final filed Apr. 23, 2009 in co-pending U.S. Appl. No. 11/006,440, 34 pages.
Supplemental Amendment filed Jul. 17, 2009 in co-pending U.S. Appl. No. 11/006,440, 29 pages.
Notice of Allowance mailed Jul. 31, 2009 in co-pending U.S. Appl. No. 11/006,440, 15 pages.
Examiner's Amendment and Reasons for Allowance mailed Sep. 3, 2009 in co-pending U.S. Appl. No. 11/006,440, 9 pages.
Response filed Jul. 21, 2008 in co-pending U.S. Appl. No. 11/006,446, 29 pages.
Final Office action mailed Oct. 28, 2008 in co-pending U.S. Appl. No. 11/006,446, 40 pages.
Response filed Dec. 29, 2008 in co-pending U.S. Appl. No. 11/006,446, 30 pages.
Advisory action mailed Jan. 7, 2009 in co-pending U.S. Appl. No. 11/006,446, 3 pages.
RCE and Amendment filed Apr. 28, 2009 in co-pending U.S. Appl. No. 11/006,446, 33 pages.
Office action mailed Jul. 7, 2009 in co-pending U.S. Appl. No. 11/006,446, 32 pages.
Amendment filed Jul. 29, 2008 in co-pending U.S. Appl. No. 11/385,257, 26 pages.
Final Office action mailed Dec. 9, 2008 in co-pending U.S. Appl. No. 11/385,257, 35 pages.
RCE and Amendment filed May 11, 2009 in co-pending U.S. Appl. No. 11/385,257, 33 pages.
Supplemental Response filed May 26, 2009 in co-pending U.S. Appl. No. 11/385,257, 3 pages.
Notice of Non-Compliant Amendment mailed Jun. 1, 2009 in co-pending U.S. Appl. No. 11/385,257, 3 pages.
Response filed Jun. 30, 2009 in co-pending U.S. Appl. No. 11/385,257, 31 pages.
Office action mailed Sep. 14, 2009 in co-pending U.S. Appl. No. 11/385,257, 37 pages.
Office action mailed Nov. 12, 2008 in co-pending U.S. Appl. No. 11/319,758, 30 pages.
Amendment filed May 12, 2009 in co-pending U.S. Appl. No. 11/319,758, 35 pages.
Final Office action mailed Aug. 3, 2009 in co-pending U.S. Appl. No. 11/319,758, 35 pages.
Office action: Restriction Requirement mailed May 13, 2008 in co-pending U.S. Appl. No. 11/006,842, 5 pages.
Response to Restriction Requirement filed Aug. 13, 2008 in co-pending U.S. Appl. No. 11/006,842, 24 pages.
Office action mailed Nov. 3, 2008 in co-pending U.S. Appl. No. 11/006,842, 21 pages.
Response filed May 4, 2009 in co-pending U.S. Appl. No. 11/006,842, 35 pages.
Supplemental Response filed Jul. 17, 2009 in co-pending U.S. Appl. No. 11/006,842, 23 pages.
Notice of Allowance mailed Jul. 27, 2009 in co-pending U.S. Appl. No. 11/006,842, 13 pages.
Office action mailed Apr. 1, 2009 in co-pending U.S. Appl. No. 11/320,538, 18 pages.
Response filed Jul. 1, 2009 in co-pending U.S. Appl. No. 11/320,538, 26 pages.
Office action mailed May 27, 2009 in co-pending U.S. Appl. No. 11/361,500, 24 pages.
Response filed Aug. 27, 2009 in co-pending U.S. Appl. No. 11/361,500, 36 pages.
Office action mailed Nov. 7, 2008 in co-pending U.S. Appl. No. 11/480,094, 19 pages.
Amendment filed May 7, 2009 in co-pending U.S. Appl. No. 11/480,094, 33 pages.
Final Office action mailed Jul. 28, 2009 in co-pending U.S. Appl. No. 11/480,094, 12 pages.
Johnston et al. Advances in Dataflow Programming Languages, ACM Computing Surveys, vol. 36, No. 1, pp. 1-34, 2004.
Navarro, "A Guided Tour to Approximate String Matching", ACM Computing Surveys, vol. 33, No. 1, pp. 31-88, 2001.
Reiss, "Semantics-Based Code Search", IEEE ICSE, pp. 243-253, 2009.
Talukdar et al., "Learning to Create Data-Integrating Queries", ACM PVLDB, pp. 785-796, 2008.
Examiner's Interview Summary mailed Oct. 27, 2009 in U.S. Appl. No. 11/005,859, 3 pages.
Amendment After Final filed Dec. 8, 2009 in U.S. Appl. No. 11/005,859, 87 pages.
Advisory Action mailed Dec. 22, 2009 in U.S. Appl. No. 11/005,859, 2 pages.
Amendment After Final filed Dec. 4, 2009 in U.S. Appl. No. 11/007,139, 25 pages.
Advisory action mailed Dec. 14, 2009 in U.S. Appl. No. 11/007,139, 4 pages.
Request for Continued Examination and Amendment filed Jan. 4, 2010 in U.S. Appl. No. 11/007,139, 27 pages.

Amendment After Final filed Nov. 30, 2009 in U.S. Appl. No. 11/006,320, 8 pages.
Office action mailed Dec. 4, 2009 in U.S. Appl. No. 11/006,320, 13 pages.
Issue Notification mailed Oct. 28, 2009 in U.S. Appl. No. 11/006,848, 1 page.
Patent Application filed Oct. 5, 2009 in co-pending U.S. Appl. No. 12/573,829, 59 pages.
Preliminary Amendment and Response to Missing Parts filed Dec. 21, 2009 in copending U.S. Appl. No. 12/573,829, 19 pages.
Letter re IDS considered by Examiner mailed Oct. 21, 2009 in U.S. Appl. No. 11/006,841, 5 pages.
Issue Notification mailed Nov. 11, 2009 in U.S. Appl. No. 11/006,841, 1 page.
Patent Application filed Oct. 13, 2009 in co-pending U.S. Appl. No. 12/578,411, 65 pages.
Letter re IDS considered by Examiner mailed Oct. 21, 2009 in U.S. Appl. No. 11/006,440, 5 pages.
Issue Fee and Comments Regarding Examiner's Statement of Reasons for Allowance filed Nov. 2, 2009 in U.S. Appl. No. 11/006,440, 12 pages.
Notice of Non-Compliant IDS mailed Nov. 12, 2009 in U.S. Appl. No. 11/006,440, 1 page.
Issue Notification mailed Dec. 2, 2009 in U.S. Appl. No. 11/006,440, 1 page.
Patent Application and Preliminary Amendment filed Nov. 30, 2009 in co-pending U.S. Appl. No. 12/627,816, 86 pages.
Examiner's Interview Summary mailed Oct. 26, 2009 in U.S. Appl. No. 11/006,446, 4 pages.
Response filed Dec. 7, 2009 in U.S. Appl. No. 11/006,446, 30 pages.
Amendment filed Jan. 13, 2010 in U.S. Appl. No. 11/385,257, 34 pages.
Request for Continued Examination and Amendment filed Jan. 4, 2010 in U.S. Appl. No. 11/319,758, 40 pages.
Letter re IDS considered by Examiner mailed Oct. 22, 2009 in U.S. Appl. No. 11/006,842, 4 pages.
Issue Fee filed Oct. 27, 2009 in U.S. Appl. No. 11/006,842, 1 page.
Notice of Non-Compliant IDS mailed Nov. 3, 2009 in U.S. Appl. No. 11/006,842, 1 page.
Patent Application filed Nov. 5, 2009 in co-pending U.S. Appl. No. 12/613,450, 55 pages.
Final Office action mailed Nov. 2, 2009 in U.S. Appl. No. 11/320,538, 20 pages.
Amendment After Final filed Jan. 4, 2010 in U.S. Appl. No. 11/320,538, 23 pages.
Notice of Allowance mailed Dec. 11, 2009 in U.S. Appl. No. 11/361,500, 14 pages.
Issue Fee filed Jan. 6, 2010 in U.S. Appl. No. 11/361,500, 23 pages.
Request for Continued Examination and Amendment filed Dec. 28, 2009 in U.S. Appl. No. 11/480,094, 36 pages.
U.S. Appl. No. 11/005,859: RCE with Amendment filed Jan. 7, 2010, 87 pages.
U.S. Appl. No. 11/005,859: Non-Final Office Action mailed Jan. 21, 2010, 17 pages.
U.S. Appl. No. 11/005,859: Response to Non-Final Office Action filed Feb. 25, 2010, 85 pages.
U.S. Appl. No. 11/005,859: Final Office Action mailed Jun. 8, 2010, 9 pages.
U.S. Appl. No. 11/007,139: RCE with amendment filed Jan. 4, 2010, 27 pages.
U.S. Appl. No. 11/007,139: Non-Final Office Action mailed Jan. 27, 2010, 31 pages.
U.S. Appl. No. 11/007,139: Response to Non-Final Office Action filed Apr. 27, 2010, 30 pages.
U.S. Appl. No. 11/006,320: Response to Non-Final Office Action filed Feb. 23, 2010, 11 pages.
U.S. Appl. No. 11/006,320: Final Office Action mailed May 24, 2010, 11 pages.
U.S. Appl. No. 12/573,829: Notice of Publication mailed Apr. 15, 2010, 1 page.
U.S. Appl. No. 12/573,829: Examiner's Search Strategy and Results dated Jun. 11, 2010, 1 page.
U.S. Appl. No. 12/578,411: Notice of Missing Parts mailed Oct. 28, 2009, 2 pages.
U.S. Appl. No. 12/578,411: Response to Missing Parts filed Dec. 28, 2009, 25 pages.
U.S. Appl. No. 12/578,411: Notice of Publication mailed Apr. 15, 2010, 1 page.
U.S. Appl. No. 12/627,816: Notice of Missing Parts mailed Dec. 15, 2009, 2 pages.
U.S. Appl. No. 12/830,236 filed Jul. 2, 2010, LeTorneau.
Cole, Richard, Harihan, Ramesh, and Indyk, Piotr Tree pattern matching and subset matching in deterministic O(n log3 n)-time, Proceedings of the tenth annual ACM-SIAM symposium on Discrete algorithms, pp. 1-10, Jan. 4, 1999, Baltimore, Maryland, United States.
Dubiner, M. and Magen, E. "Faster Tree Pattern Matching." Journal of the Association for Computing Machinery, vol. 41, No. 2, Mar. 1994, pp. 205-213.
Durango Bill's Enumeration of Trees. http//web.archive.org/web/20021028184112/http://www.durangobill.com/Trees.html.
Iacob et al., "XPath Extension for Querying Concurrent XML Markup", Technical Report #TR 394-04, Department of Computer Science, University of Kentucky, Lexington, KY 40506, Mar. 6, 2004, 15 pages.
Knuth, "The Art of Computer Programming", vol. 1 Fundamental Algorithms, Second edition, Addison-Wesley Series in *Computer Science and Information Processing*, ISBN 0-201-03809-9, Reading, Massachusetts, Copyright 1973.
Leinonen et al., "Automation of Document Structure Transformations", Auditorium, Microteknia Building, University of Kuopio, Nov. 5, 2004, 68 pages.
Lerman et al., "Learning the Common Structure of Data", American Association for Artificial Intelligence, AAAI-00 Proceedings, www.aaai.org, Apr. 13, 2000, 6 pages.
Ramesh, R. and Ramakrishnan, I.V., "Nonlinear Pattern Matching in Trees." Journal of the Association for Computing Machinery, vol. 39, No. 2, Apr. 1992, pp. 295-316.
U.S. Appl. No. 11/005,859: Response to Final Office Action filed Sep. 1, 2010, 91 pages.
U.S. Appl. No. 11/005,859: Advisory Action mailed Sep. 14, 2010, 7 pages.
U.S. Appl. No. 11/005,859: Notice of Appeal filed Sep. 29, 2010, 3 pages.
U.S. Appl. No. 11/007,139: Final Office Action mailed Jul. 20, 2010, 22 pages.
U.S. Appl. No. 11/006,320: Response to Final Office Action filed Aug. 24, 2010, 17 pages.
U.S. Appl. No. 11/006,320: Notice of Allowance/Allowability mailed Sep. 17, 2010, 18 pages.
U.S. Appl. No. 12/573,829: Non-Final Office Action mailed Jun. 28, 2010 with Examiner Search Strategy and Results, 127 pages.
U.S. Appl. No. 12/573,829: Response to Non-final Office Action filed Sep. 28, 2010, 24 pages.
U.S. Appl. No. 12/627,816: Notice of Publication mailed Jul. 29, 2010, 1 page.
U.S. Appl. No. 12/830,236: Divisional Application filed Jul. 2, 2010, 103 pages.
U.S. Appl. No. 11/385,257: Request for Continued Examination filed Aug. 12, 2010, 35 pages.
U.S. Appl. No. 11/319,758: Response to Non-final Office Action filed Jul. 29, 2010, 30 pages.
U.S. Appl. No. 12/702,243: Notice of Publication mailed Aug. 12, 2010, 1 page.
U.S. Appl. No. 11/005,859: Office Action Response mailed Jan. 18, 2011, 95 pages.
U.S. Appl. No. 11/007,139: Office Action mailed Jan. 3, 2011, 24 pages.
U.S. Appl. No. 11/007,139: Office Action response and Notice of Appeal mailed Dec. 20, 2010, 29 pages.
U.S. Appl. No. 11/007,139: Advisory Action mailed Dec. 1, 2010, 4 pages.
U.S. Appl. No. 11/007,139: Office Action response mailed Nov. 18, 2010, 24 pages.

U.S. Appl. No. 11/006,320: Issue Notification mailed Jan. 12, 2011, 1 page.
U.S. Appl. No. 11/006,320: Rule 312 Amendment and Issue Fee payment mailed Dec. 17, 2010, 10 pages.
U.S. Appl. No. 11/006,320: Examiner Interview Summary and supplemental Notice of Allowance mailed Dec. 17, 2010, 9 pages.
U.S. Appl. No. 12/972,326: Filing receipt and Notice to File Missing Parts mailed Jan. 6, 2011, 5 pages.
U.S. Appl. No. 12/972,326: Copy of Application as filed on Dec. 17, 2010, 74 pages.
U.S. Appl. No. 12/573,829: Notice of Appeal mailed Jan. 11, 2011, 1 page.
U.S. Appl. No. 12/573,829: Advisory Action mailed Jan. 7, 2010, 3 pages.
U.S. Appl. No. 12/573,829: Office Action Response mailed Jan. 3, 2011, 29 pages.
U.S. Appl. No. 12/573,829: Office Action mailed Nov. 1, 2010, 29 pages.
U.S. Appl. No. 12/830,236: Notice of Publication mailed Dec. 16, 2010, 1 page.
U.S. Appl. No. 11/319,758: Office Action mailed Oct. 28, 2010, 31 pages.
U.S. Appl. No. 11/320,538: Office action mailed Dec. 22, 2010, 10 pages.
U.S. Appl. No. 11/480,094: Office Action mailed Dec. 15, 2010, 13 pages.

* cited by examiner

| Natural # | BEL Trees |
|---|---|
| 0 |  |
| 1 |  |
| 2 |  |
| 3 |  |
| 4 |  |
| 5 |  |
| 6 |  |

400

$P(1) = 2$ $P(2) = 3$ $P(3) = 5$ $P(4) = 7$ $\vdots$ $P(2k-1)$ $P(2k)$ $\vdots$

MANIPULATION AND/OR ANALYSIS OF HIERARCHICAL DATA

RELATED APPLICATION

This application claims priority to U.S. Provisional Patent Application Ser. No. 60/675,987 filed Apr. 29, 2005, entitled MANIPULATION AND/OR ANALYSIS OF HIERARCHICAL DATA, assigned to the assignee of claimed subject matter.

BACKGROUND

This disclosure is related to hierarchical data arrangements and, more particularly, to manipulating such data arrangements.

In a variety of fields, data or a set of data, may be represented in a hierarchical fashion. This form of representation may, for example, convey information, such as particular relationships between particular pieces of data and the like. However, manipulating such data representations is not straight-forward, particularly where the data is arranged in a complex hierarchy. Without loss of generality, one example may include a relational database. Techniques for performing operations on such a database, for example, are computationally complex or otherwise cumbersome. A continuing need, therefore, exists for additional techniques for manipulating data hierarchies.

BRIEF DESCRIPTION OF THE DRAWINGS

Subject matter is particularly pointed out and distinctly claimed in the concluding portion of the specification. Claimed subject matter, however, both as to organization and method of operation, together with objects, features, and advantages thereof, may best be understood by reference of the following detailed description when read with the accompanying drawings in which:

FIG. 5 is a table illustrating a portion of the Kleene enumeration of non-composite numerals;

FIG. 10A is a schematic diagram of a target tree according to an embodiment;

DETAILED DESCRIPTION

Figure 1:
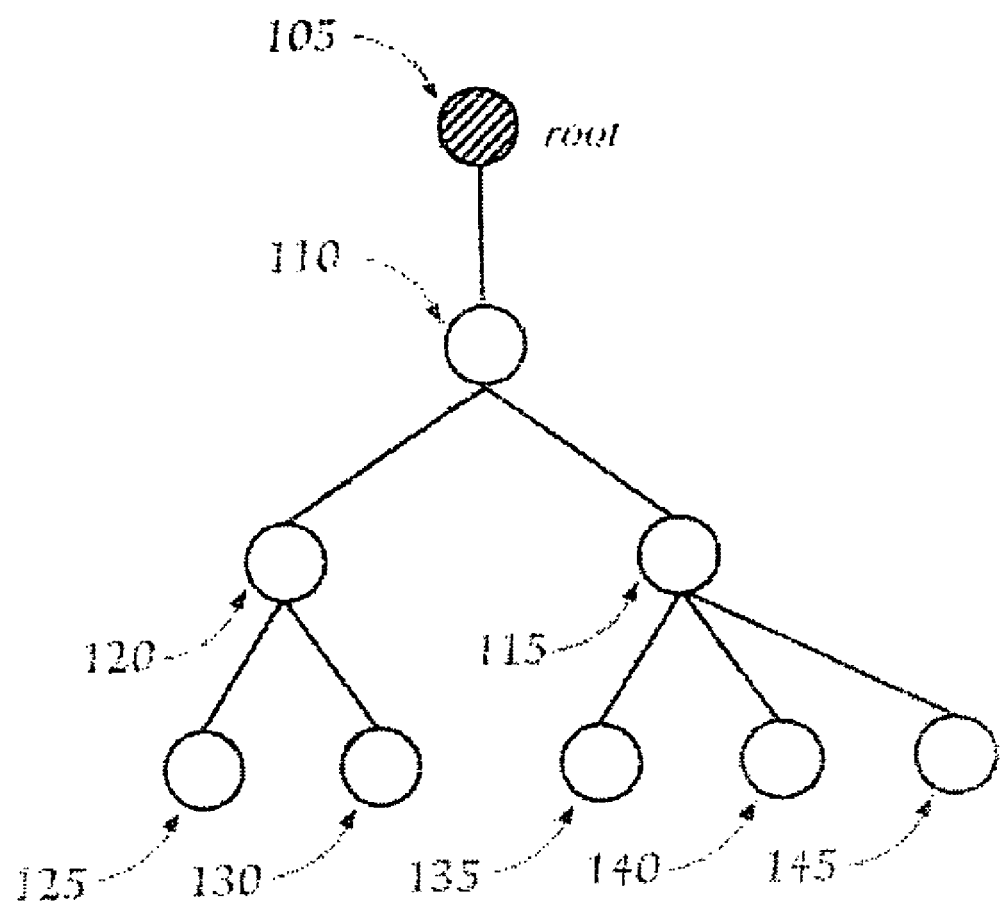
FIG. 1 is a schematic diagram of one embodiment of a tree.

In the following detailed description, numerous specific details are set forth to provide a thorough understanding of claimed subject matter. However, it will be understood by those skilled in the art that claimed subject matter may be practiced without these specific details. In other instances, well-known methods, procedures, components and/or circuits have not been described in detail so as not to obscure claimed subject matter.

Some portions of the detailed description which follow are presented in terms of algorithms and/or symbolic representations of operations on data bits or binary digital signals stored within a computing system memory, such as a computer memory. These algorithmic descriptions and/or representations are the techniques used by those of ordinary skill in the data processing arts to convey the substance of their work to others skilled in the art. An algorithm is here, and generally, considered to be a self-consistent sequence of operations and/or similar processing leading to a desired result. The operations and/or processing involve physical manipulations of physical quantities. Typically, although not necessarily, these quantities may take the form of electrical and/or magnetic signals capable of being stored, transferred, combined, compared and/or otherwise manipulated. It has proven convenient at times, principally for reasons of common usage, to refer to these signals as bits, data, values, elements, symbols, characters, terms, numbers, numerals and/or the like. It should be understood, however, that all of these and similar terms are to be associated with the appropriate physical quantities and are merely convenient labels. Unless specifically stated otherwise, as apparent from the following discussion, it is appreciated that throughout this specification discussions utilizing terms such as "processing", "computing", "calculating", "transforming," "converting," "factoring," enumerating," "representing," "storing," "associating," "substituting," "determining" and/or the like refer to the actions and/or processes of a computing platform, such as a computer or a similar electronic computing device, that manipulates and/or transforms data represented as physical electronic and/or magnetic quantities and/or other physical quantities within the computing platform's processors, memories, registers, and/or other information storage, transmission, and/or display devices. Further, unless specifically stated otherwise, processes described herein, with reference to flow diagrams or otherwise, may also be executed and/or controlled, in whole or in part, by such a computing platform.

In a variety of fields, data or sets of data may be represented in a hierarchical fashion. This form of representation may, for example, convey information, such as particular relationships between particular pieces of data and the like. However, manipulating such data representations is not straight forward, particularly where the data is arranged in a complex hierarchy. Without loss of generality, one example may include a relational data base. Techniques for performing operations on such a data base for example, may be computationally complex or otherwise cumbersome. A continuing need, therefore, exists for additional techniques for manipulating data hierarchies.

As previously discussed, in a variety of fields, it is convenient or desirable to represent data, a set of data and/or other information in a hierarchical fashion. In this context, such a hierarchy of data shall be referred to as a "tree." In a particular embodiment, a tree may comprise a finite, rooted, connected, unordered, acyclic graph. This is illustrated here, for example, in FIG. 1 by embodiment 100. As illustrated, the root of this particular embodiment encompasses node 105. In addition to 105, there are eight other nodes designated 110 to 140, respectively. Likewise, the nodes are connected by branches referred to, in this context, as edges. Thus, the nodes of this tree are connected by eight edges. This embodiment, therefore, illustrates a finite tree that is rooted by node 105. Furthermore, the nodes are connected, meaning, in this context, that a path exists between any two nodes of the tree. The tree is likewise acyclic, meaning here, that no path in the tree forms a complete backtracking loop. Here, unordered refers to the notion that there is no implied ordering or precedence among nodes attached to a common node, despite the appearance of ordering in a graphical illustration.

As previously suggested, in a variety of contexts, it may be convenient and/or desirable to represent a hierarchy of data and/or other information using a structure, such as the embodiment illustrated in FIG. 1. One particular embodiment, without loss of generality, of a tree may include edges that are labeled with data and/or other values. Likewise, in one particular embodiment, such data or values may be limited to binary data, that is, in this example, either a binary one or a binary zero. Here, such an embodiment may be referred to as a binary edge labeled tree (BELT), as shall be discussed in more detail hereinafter.

Figure 2:
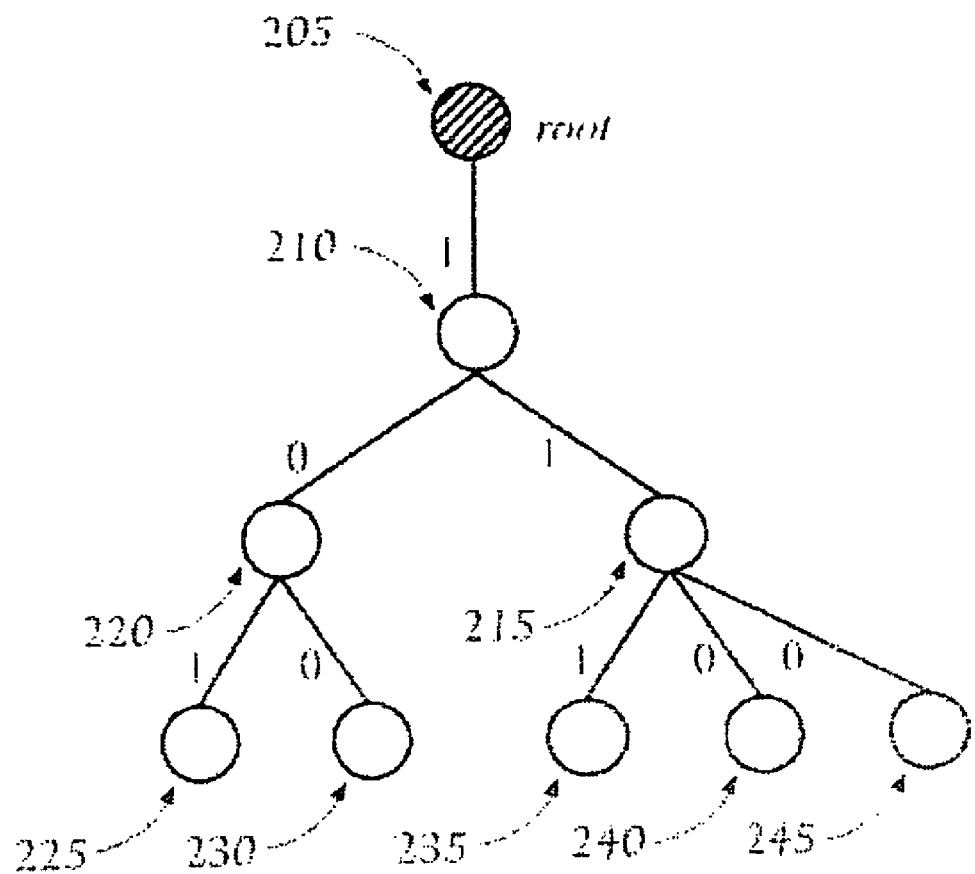
FIG. 2 is a schematic diagram illustrating one embodiment of a binary edge labeled tree (BELT)
Figure 3:
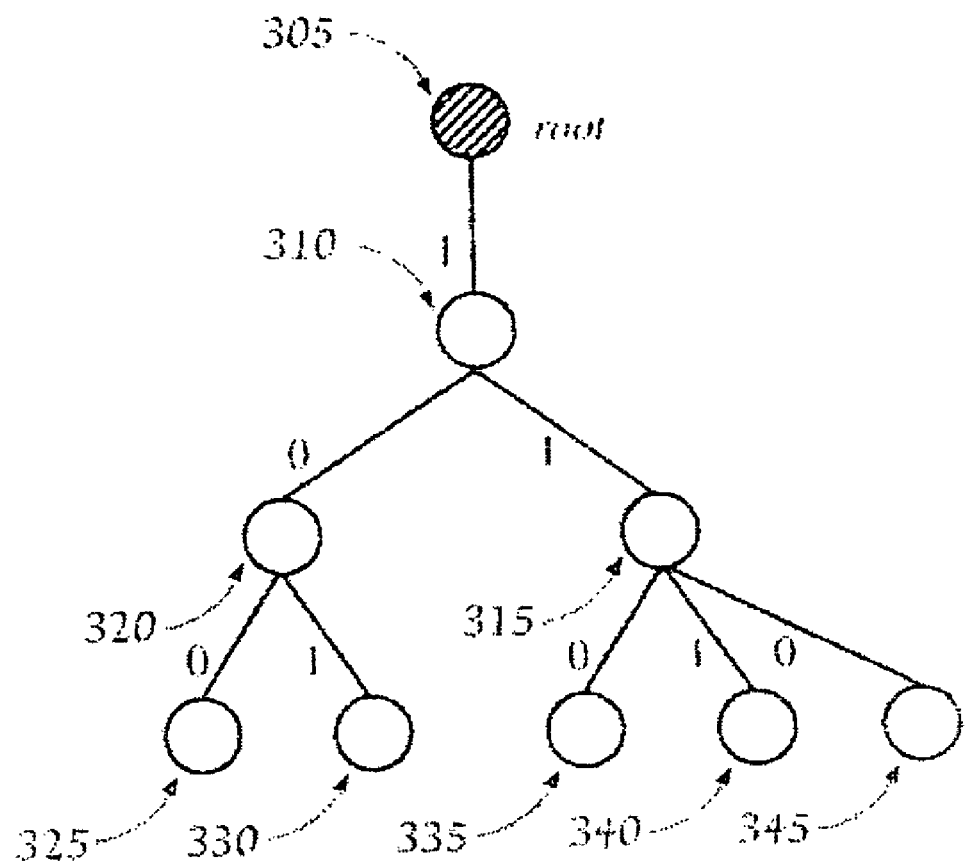
FIG. 3 is a schematic diagram illustrating another embodiment of a BELT.

One example of a BELT is illustrated by embodiment 200 of FIG. 2. Thus, as illustrated, the edges of the BELT shown in FIG. 2 are labeled with either a binary zero or binary one. FIG. 3 illustrates another embodiment 300 of a different binary edge labeled tree. It is noted that this tree is similar to the embodiment of FIG. 2. Without belaboring the present discussion, additional descriptions of how BELTs may represent a hierarchy of data may be found in U.S. patent application Ser. No. 11/005,859, filed on Dec. 6, 2004, by J. J. LeTourneau, titled, "Manipulating Sets of Hierarchical Data," assigned to the assignee of the subject matter claimed herein.

Figure 4:
FIG. 4 is a table illustrating a particular embodiment of an association between natural numerals and BELTs.
Figure 4:
Figure 4:
Figure 4:
Figure 4:
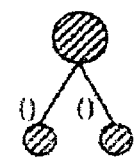
Figure 4:
Figure 4:
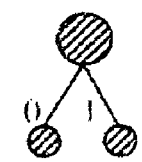

The terms "non-composite numeral" and "primary numeral" shall be used interchangeably herein. Being trees, BELTs may also be enumerated. Thus, for this particular embodiment, although claimed subject matter is not limited in scope in this respect, a method of enumerating a set of trees begins with enumeration of an empty binary edge labeled tree and a one node binary edge labeled tree. Here, the empty tree is associated with the zero and has a symbolic representation as illustrated in FIG. 4 (circle). Likewise, the one node tree, which holds no data, is associated with the numeral one and has a graphical representation of a single node. For higher positive natural numerals, however, this embodiment of a method of enumerating a set of trees comprises positioning a tree at location k, k being a positive numeral greater than three, where k is the product of u and v, u and v comprising positive numerals greater than one, such that the tree is formed by a union of the trees at positions u and v. Likewise, for those locations that are not a product of other natural positive numerals greater than one, that is, for locations that comprise non-composite numerals, denoted here by j, for example, j being a positive natural numeral greater than one, a tree is positioned at location j such that the tree is formed by finding the first tree in the prior enumeration such that the binary edge labeled tree obtainable from this first tree by attaching a node to the particular tree as a new root node and labeling the edge between the new root node and the prior root node with a binary "0" label is not in the enumeration at some position lower than j; however, if the binary edge labeled tree obtainable from that first tree, as just described, is present in the enumeration with a binary "0" label for the new edge, but not with a binary "1" label, then the tree at position j is that tree with a binary "1" label for the new edge. This may be illustrated; for example in FIG. 4, as described in more detail below.

However, for this particular embodiment, although claimed subject matter is not limited in scope in this respect, a method of enumerating a set of ordered trees may begin with enumeration of an empty binary edge labeled tree and a one node binary edge labeled tree. Thus, the empty tree is associated with numeral zero and has a symbolic representation as illustrated in FIG. 4 (circle). Likewise, the one node tree, which holds no data, is associated with numeral one and has a graphical representation of a single node. For higher positive natural numerals, ordered trees may be generated by a process described, for example, in "The Lexicographic Generation of Ordered Trees," by S. Zaks, The Journal of Theoretical Computer Science, Vol. 10(1), pp. 63-82, 1980, or Enumerating Ordered Trees Lexicographically," by M. C. Er, Computation Journal, Vol. 28, Issue 5, pp. 538-542, 1985.

As illustrated, for this particular embodiment, and as previously described, the empty tree has zero nodes and is associated with numeral zero. Likewise, the one node tree root comprises a single node and is associated with numeral one. Thus, to obtain the tree at position two, a root node is attached and connected to the prior root node by an edge. Likewise, here, by convention, the edge is labeled with a binary zero. If, however, the tree formed by the immediately proceeding approach were present in the prior enumeration of trees, then a similar process embodiment is followed, but, instead, the new edge is labeled with a binary one rather than a binary zero. Thus, for example, in order to obtain the binary edge labeled tree for position three, a new root node is connected to the root node by an edge and that edge is labeled with a binary one.

Continuing with this example, to obtain the binary edge labeled tree for position four, observe that numeral four is the product of numeral two times numeral two. Thus, a union is formed at the root of two trees, where, here, each of those trees is associated with the numeral two. Likewise, to obtain the binary edge labeled tree for position five, begin with the binary edge labeled tree for position two and follow the previously articulated approach of adding a root and an edge and labeling it with a binary zero.

Figure 5:
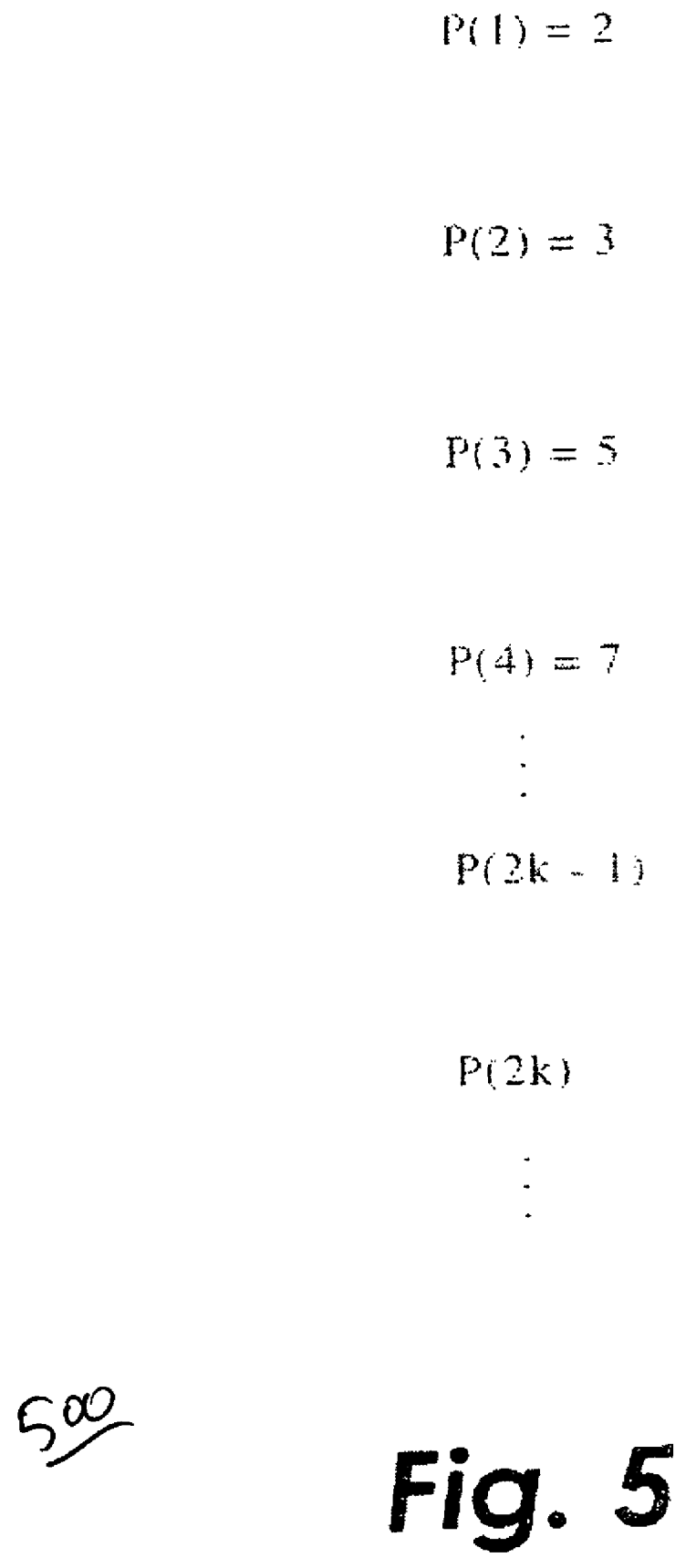

In this context, adding a root node and an edge and labeling it binary zero is referred to as a "zero-push" operation and adding a root node and an edge and labeling it binary one is referred to as a "one-push" operation. Based at least in part on the prior description, for this particular embodiment, it may now be demonstrated that if k is any positive natural numeral and a tree x is positioned at location k, then a non-composite numeral is associated with the zero-push of that tree and a non-composite numeral is associated with the one-push for that tree. Furthermore, the non-composite index of the zero-push of the tree comprises 2k−1, whereas the non-composite index of the one-push of the tree comprises 2k, where the index corresponds to the argument of the well-known Kleene enumeration on positive natural numerals of non-composite numerals, as illustrated, for example, in part in FIG. 5. Thus, referring again to FIG. 4, the one-push of the root tree is the tree at position three. This follows from FIG. 5 since P(2*1)= P(2)=3. Likewise, the tree at position five is the zero-push of the tree at position 2. Again, this follows from FIG. 5 since P(2*2−1)=P(3)=5.

In this context, the approach just described may be referred to as vectorizing non-composite numerals. In the embodiment just described, this was accomplished in pairs, although, of course, claimed subject matter is not limited in scope in this respect. This may be accomplished in any number of numeral combinations, such as triplets, quadruplets, etc. Thus, using a quadruplet example, it is possible to construct trees such that if k is any positive natural numeral and a tree x is positioned at location k, then a non-composite numeral is associated with the zero-push of that tree, a non-composite numeral is associated with the one-push for that tree, a non-composite numeral is associated with the two-push for that tree, and a non-composite number is associated with the three-push for that tree. Furthermore, the index of the non-composite numeral is such that for a zero-push of the tree, the index comprises (4k−3), for a one-push of a tree, the index comprises (4k−2), for a two-push of a tree, the index comprises (4k−1), and for a three-push of a tree the index comprise (4k), where the index corresponds to the Kleene enumeration of non-composite numerals, P(index), such as provided in FIG. 5.

In the previously described enumeration of binary edged labeled trees, a mechanism may be employed to reduce or convert and/or transform complex manipulations of hierarchical data to multiplication of natural numerals. For example, if it is desired to combine, or merge at their roots, two trees of hierarchical data, a complex task both computationally and graphically, instead, for this particular embodiment, the two trees may be transformed to numerical data by using the previously described association embodiment between binary edge labeled trees and natural numerals. The resulting numerical data from the prior conversion may then be multiplied, and the resulting product may then be transformed to a binary edge labeled tree by using a table look up of the previously described association embodiment. It is noted that a subtle distinction may be made between an enumeration embodiment and an association embodiment. Enumeration may comprise listing, in this example, a particular ordered embodiment of BELTs, whereas an association provides a relationship between, in this example, a particular ordered embodiment of BELTs and natural numerals. It is, of course, appreciated that many different enumeration and association embodiments may be employed to execute the operations discussed above and hereinafter, and claimed subject matter is intended to cover all such enumeration and association embodiments.

Likewise, a process embodiment that is a reversal to the previously described embodiments may also be employed. Thus, complex hierarchies of data may be split or divided, when this is desired. For example, a binary edge labeled tree to be divided may be transformed to a piece of numerical data, such as by using the previously described association embodiment. This data may then be factored into two pieces of numerical data whose product produces the previously mentioned piece of numerical data. These two pieces of numerical data may then be transformed to trees, again, by using the prior association embodiment, for example.

Another form of manipulating hierarchical sets of data may involve ordering or hashing. This may be desirable for any one of a number of different operations to be performed on the sets of data. One approach is similar to the previously described embodiment. For example, it may be desired to order a given set of trees. Doing so may involve transforming the trees to numerical data, as previously described, using an association embodiment. The numerical data may then be ordered and the numerical data may then be transformed back to binary edge labeled trees using the previously described association embodiment, or an alternate association embodiment, for example.

It is noted that there may be any one of a number of different ways of transforming from numerals or numerical data values to a binary edge labeled tree or from a binary string to a binary edge labeled tree, and vice-versa. Nonetheless, a convenient method for doing so with this particular embodiment includes storing an array providing an association embodiment between natural numerals, binary strings and binary edge labeled trees, such as the embodiment previously described. Thus, once it is desired to convert from one to the other, such as from a binary string to a BELT, from a natural numeral to a BELT, or vice-versa, for example, a table look up operation may be performed using the association embodiment.

Techniques for performing table look ups are well-known and well-understood. Thus, this will not be discussed in detail here. However, it shall be appreciated that any and all of the previously described and/or later described processing, operations, conversions, transformations, manipulations, etc. of strings, trees, numerals, data, etc. may be performed on one or more computing platforms or similar computing devices, such as those that may include a memory to store an array as just described, although, claimed subject matter is not necessarily limited in scope to this particular approach. Thus, for example, a hierarchy of data may be formed by combining two or more hierarchies of data, such as by applying a previously described embodiment. Likewise, multiple hierarchies of data may be formed by splitting or dividing a particular hierarchy of data, again, such as by applying a previously described embodiment. Likewise, additional operations and/or manipulations of data hierarchies may be performed, such as ordering hierarchies of data and more. It is intended that claimed subject matter cover such embodiments.

Much of the prior discussion was provided in the context of binary edge labeled trees. Nonetheless, as alluded to previously, binary edge labeled trees and binary node labeled trees may be employed nearly interchangeably to represent substantially the same hierarchy of data. In particular, a binary node labeled tree may be associated with a binary edge labeled tree where the nodes of the binary node labeled tree take the same values as the edges of the binary edge labeled tree, except that the root node of the binary node labeled tree may comprise a node having a zero value or a null value. Thus, rather than employing binary edge labeled trees, the previously described embodiments may alternatively be performed using binary node labeled trees. As one example embodiment, operations and/or manipulations may be employed using binary edge labeled trees and then the resulting binary edge labeled tree may be converted to a binary node labeled tree. However, in another embodiment, operations and/or manipulations may be performed directly using binary node labeled trees where a different association embodiment, that is, in this example, one that employs binary node labeled trees, is employed.

In accordance with claimed subject matter, therefore, any tree, regardless of whether it is binary edge labeled, binary node labeled, non-binary, a feature tree, or otherwise, may be manipulated and/or operated upon in a manner similar to the approach of the previously described embodiments. Typically, different association embodiments shall be employed, depending at least in part, for example, upon the particular type of tree. For example, and as shall be described in more detail below in connection with FIG. 6, a node labeled tree in which the nodes are labeled with natural numerals or data values may be converted to a binary edge labeled tree. Furthermore, this may be accomplished with approximately the same amount of storage. For example, for this particular embodiment, this may involve substantially the same amount of node and/or edge data label values.

Figure 6:
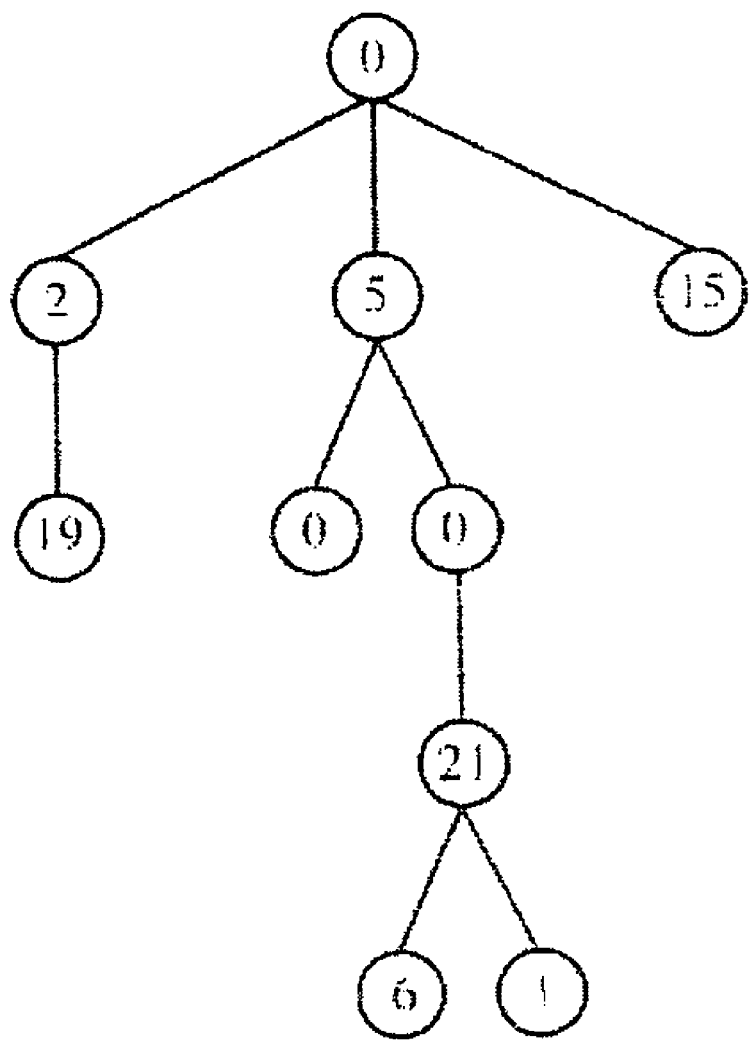
FIG. 6 is a schematic diagram of an embodiment of a node labeled tree.

As previously noted, claimed subject matter is not limited in scope to this particular example, however, as illustrated in more detail hereinafter, the tree illustrated in FIG. 6 is converted to a binary edge labeled tree through a sequence of processing depicted here as graph operations, although such a conversion may alternatively be implemented by operations implemented otherwise, one such example being a computing platform, for example. Alternatively, it may be desirable, depending upon the particular embodiment, to convert trees to, for example binary node labeled trees. Likewise, other embodiments in which trees of one form are converted to trees of another form are also included within the scope of the claimed subject. However, for this particular embodiment, it will be assumed that the association between trees and numerals, such as previously described, is depicted or enumerated in terms of binary edge labeled trees, as previously illustrated, for example. Thus, in this example, a particular tree, embodiment 600, is illustrated in FIG. 6, comprises a node labeled tree rather than an edge labeled tree. Without belaboring the present discussion, a process of converting a node labeled tree such as that illustrated in FIG. 6 to a BELT may be found in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Figure 7:
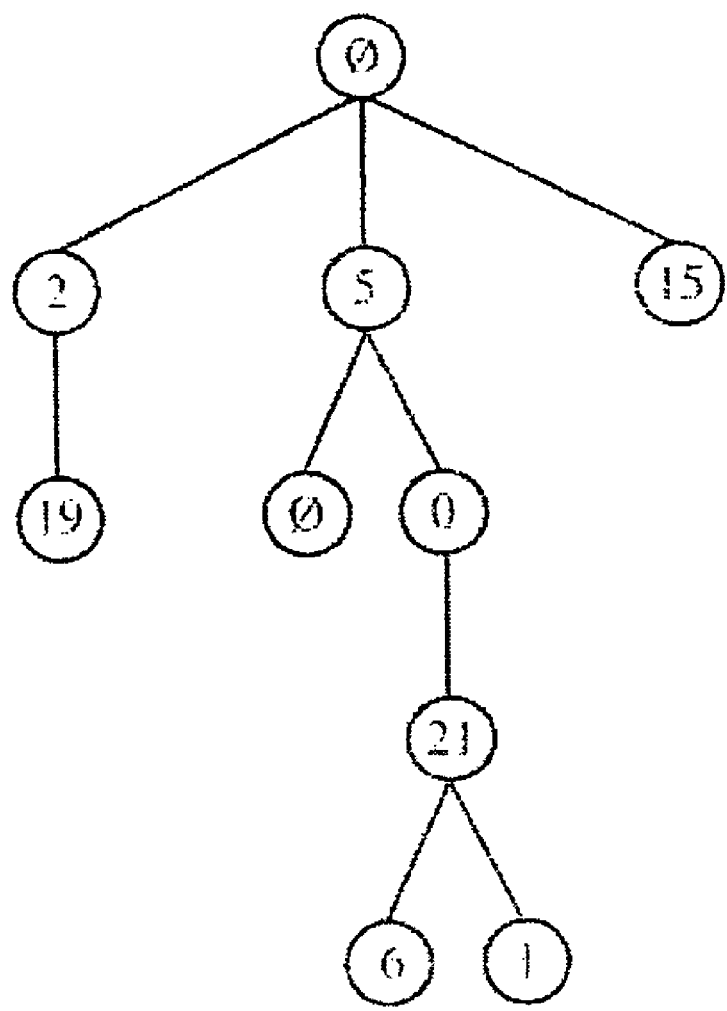
FIG. 7 is a schematic diagram illustrating another embodiment of a node labeled tree.

In another embodiment, however, a particular tree may include null types or, more particularly, some node values denoted by the empty set. This is illustrated, for example, by the tree in FIG. 7, although, of course, this is simply one example. An advantage of employing null types includes the ability to address a broader array of hierarchical data sets. For example, without loss of generality and not intending to limit the scope of claimed subject matter in any way, a null type permits representing in a relational database, as one example, situations where a particular attribute does not exist. As may be appreciated, this is different from a situation, for example, where a particular attribute may take on a numeral value of zero. Thus, it may be desirable to be able to address both situations when representing, operating upon and/or manipulating hierarchical sets of data. A tree with nulls may be converted to a tree without nulls as described in U.S. patent application Ser. No. 11/005,859, filed on Dec. 6, 2004, by J. J. LeTourneau, titled, "Manipulating Sets of Hierarchical Data," assigned to the assignee of the presently claimed subject matter.

Likewise, in an alternative embodiment, a node labeled tree may comprise fixed length tuples of numerals. For such an embodiment, such multiple numerals may be combined into a single numeral, such as by employing Cantor pairing operations, for example. See, for example, *Logical Number Theory, An Introduction*, by Craig Smorynski, pp. 14-23, available from Springer-Verlag, 1991. This approach should produce a tree to which the previously described embodiments may then be applied. Furthermore, for one embodiment, a tree in which nodes are labeled with numerals or numerical data, rather than binary data, may be transformed to a binary edge labeled tree and/or binary node labeled tree, and, for another embodiment, a tree in which edges are labeled with numerals or numerical data, rather than binary data, may be transformed to a binary edge labeled tree and/or binary node labeled tree.

Furthermore, a tree in which both the nodes and the edges are labeled may be referred to in this context as a feature tree and may be transformed to a binary edge labeled tree and/or binary node labeled tree. For example, without intending to limit the scope of claimed subject matter, in one approach, a feature tree may be transformed by converting any labeled node with its labeled outgoing edge to an ordered pair of labels for the particular node. Using the embodiment described above, this tree may then be transformed to a binary edge labeled tree.

In yet another embodiment, for trees in which data labels do not comprise simply natural numerals, such as, as one example, trees that include negative numerals, such data labels may be converted to an ordered pair of numerals. For example, the first numeral may represent a data type. Examples include a data type such as negative, dollars, etc. As described above, such trees may also be transformed to binary edge labeled trees, such as by applying the previously described embodiment, for example.

As previously described, trees may be employed to graphically represent a hierarchy of data or a hierarchy of a set of data. This has been illustrated in some detail for binary edge labeled trees, for example. As the previous figures, illustrate, however, such graphical hierarchical representations typically employ two spatial dimensions to depict the relationship among different pieces of data. This may be disadvantageous in some situations where a one dimensional representation or arrangement of symbols, such as is employed with alphabetic letters, for example, that are combined to create a linear collection of successive symbols or notations, such as words, would be more convenient.

According to an embodiment, a tree may comprise one or more "subtrees" coupled at the root node of the tree. A subtree of a larger tree may comprise a "subtree root" node other than the root node of the larger and independently have properties of a tree, except that the subtree is part of the larger tree. In addition to a subtree root node, a subtree comprises terminal nodes of a larger tree which descend from the subtree root node, and edges and intermediate nodes connecting these terminal nodes with the subtree root node. In one embodiment, the subtree root node may be connected to the root node of the larger tree by a single edge. In another embodiment, the subtree node may be coupled to the root node of the larger tree by two or more edges and one or more intermediate nodes coupled between the root node of the larger tree and the subtree root node. While a subtree may comprise a portion of a larger tree, the size and shape of the subtree may express information like that of a tree having the same size and shape as the subtree. Subtrees coupled together at the root node of a larger tree may be referred to as "subtree children" of the root node where a subtree may be referred to as a "subtree child" of the tree in this embodiment.

According to an embodiment, a tree may comprise one or more "partial subtrees" (PSTs) representing at least a portion of the hierarchical data represented by the tree. Here, a PST may a subset of the nodes of a larger tree. This subset of nodes is connected by edges and a single node of the subset of nodes provides a "root" node of the PST. In a particular embodiment, a PST may represent a set of data and/or other information in a hierarchical fashion and may be represented as a finite, rooted, connected, unordered and acyclic graph. Accordingly, a PST has properties of a tree as illustrated above with reference to FIGS. 1-7, except that the PST is a part of a larger tree. As such, in a particular embodiment, any labels associated with nodes and edges in the full tree may also be associated with corresponding nodes and edges in any component PST. Also, in a particular embodiment, such a component PST may be represented by a natural numeral according to an association of natural numerals and trees such as that illustrated above with reference to FIG. 4, for example. However, this is merely an example of how a PST may be associated with a numeral according to a particular association embodiment and claimed subject matter may cover associations of PSTs to numerals according to other association embodiments. Unlike a subtree, a PST need not comprise terminal nodes of the larger tree. According to an embodiment, a PST may comprise a "rooted PST" (RPST) having properties of a PST with the additional feature that the root node of the RPST is the same as the root node of the larger tree.

Since a tree is finite, there are a finite number of paths between a root node of the tree and other nodes in the tree. Similarly, there are a finite number of combinations of paths between the root node of a tree and individual ones of the other nodes in the tree. Accordingly, in a particular embodiment, a finite number of RPSTs may be enumerated from a tree having a root node. Numerals may be associated with the enumerated RPSTs based, at least in part, on an association between trees and natural numerals such as, for example, illustrated above with reference to FIG. 4. However, this is merely an example of how RPSTs may be associated with numerals according to a particular embodiment and claimed subject matter is not limited in this respect.

According to an embodiment, the enumerated RPSTs of a tree may be represented as a "set" containing a collection of unordered elements. In a particular embodiment, the elements of the set of enumerated RPSTs may contain as elements natural numerals representing individual ones of the enumerated RPSTs according to the aforementioned association between trees and numerals. The elements of such a set may be alternatively expressed as graphical representations of the individual ones of the enumerated RPSTs. In a particular embodiment, a one-to-one mapping may relate elements of the set of RPSTs expressed as natural numerals and elements of the set of RPSTs expressed as graphical representations. Here, such a mapping may enable transforming graphical representations of RPSTs to corresponding natural numerals and manipulation of such natural numerals to provide resulting natural numerals. The resulting natural numerals may then be transformed back to graphical representations. However, these are merely examples of how a set of enumerated RPSTs may be expressed and claimed subject matter is not limited in these respects.

The term "depth" referred to herein in connection with a tree means the longest separation between the tree's root node and a terminal node of the tree. In a particular embodiment, although claimed subject matter is not limited in this respect, a depth may be quantified as a number of successively descending nodes are connected to the root node. In tree 100 of FIG. 1, for example, root node 105 is separated from terminal node 125 by three successively descending nodes, nodes 110, 120 and 125. However, quantifying a depth of a tree by a number of nodes between the root node and the furthest terminal node of the tree is merely an example of how depth may be quantified for a particular embodiment, and claimed subject matter is not limited in these respects.

As illustrated above, a tree is capable of storing, expressing and/or representing hierarchical data. As such, in particular embodiments of trees, it may be desirable to locate and/or detect particular elements and/or aspects of hierarchical data which is capable of being stored, expressed and/or represented in a tree. In one particular example, a tree may store, express and/or represent hierarchical data that is in a document that may comprise a piece of information that is of interest. In another embodiment, a tree may store, express and/or represent features of a pattern as hierarchical data where one or more features of the pattern may be of interest. Techniques for locating and/or detecting hierarchical data in a tree may include, for example, executing a process to traverse nodes of a tree that is stored in a memory. Such techniques may be computationally intensive.

According to an embodiment, a "target tree" may comprise hierarchical data that may or may not include a particular piece of information of interest. An embodiment of a process may represent portions of the tree as one or more "target numerals" according to an association of trees and numerals. The particular piece of information of interest may be represented as a probe numeral that is compared with the one or more target numerals to determine a match. In one embodiment, although claimed subject matter is not limited in this respect, such a match may indicate a presence of a particular piece of information that is of interest.

In a particular embodiment, although claimed subject matter is not limited in this respect, a piece of information of interest may be stored, expressed and/or represented as a "probe tree" having nodes and/or edges and having properties of a tree. As such, a probe tree may be associated with a "probe numeral" according to an association of trees and numerals such as that illustrated above with reference to FIG. 4, for example. In particular embodiments, the piece of information of interest may also be associated with a probe numeral irrespective of any representation and/or expression of the piece of information of interest as a probe tree. In one particular embodiment, although claimed subject matter is not limited in this respect, a probe tree and/or probe numeral may represent a query for locating and/or detecting a piece of information of interest that is represented in a tree. However, this is merely an example of how a probe tree and/or probe numeral may be applied in a particular embodiment and claimed subject matter is not limited in this respect.

Figure 8:
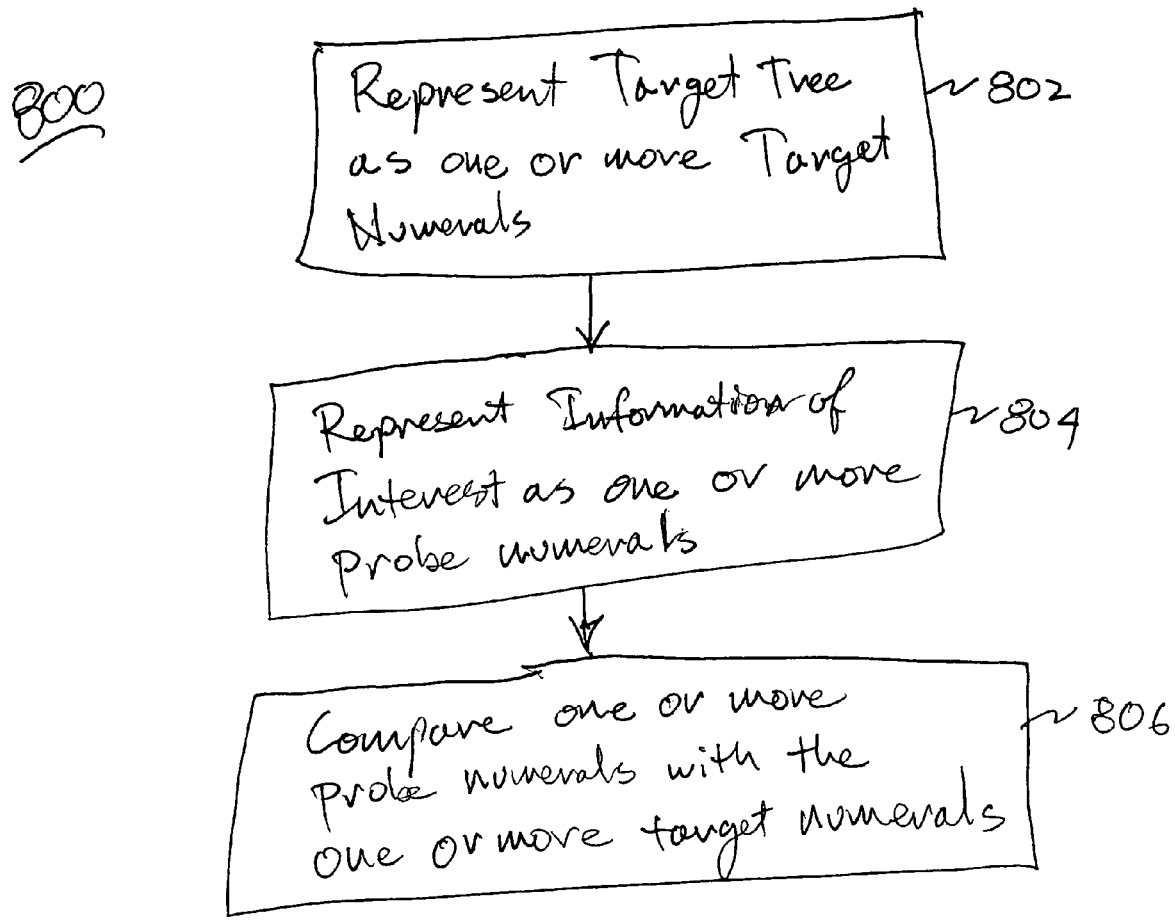
FIG. 8 is a flow diagram illustrating a process embodiment to detect and/or locate information in hierarchical data of a target tree according to an embodiment.

FIG. 8 is a flow diagram illustrating a process embodiment 800 to detect and/or locate information in hierarchical data of a target tree according to an embodiment. Block 802 represents a target tree as one or more numerals according to an association of trees and numerals. According to a particular embodiment of block 802, a computing device and/or computing platform may be used to represent the target tree as one or more target numerals according to an association of trees and numerals. Here, for example, such a computing device and/or computing platform may comprise one or more processors with a limited native word size. In executing processes to determine the target numerals, the one or more processors may also comprise limited memory. Also, as described in the aforementioned U.S. patent application Ser. No. 11/005,859, particular embodiments of enumerating numerals associated with trees may employ the use of non-composite numerals. Implementations of particular processes to enumerate such numerals associated with trees may only be capable of generating non-composite numerals up to a predetermined maximum non-composite numeral. Accordingly, a particular implementation of process embodiment 800, although claimed subject matter is not limited in this respect, may entail partitioning the target tree into smaller trees comprising clusters and/or subsets of the nodes making up the larger target tree. Block 802 may then determine the one or more target numerals based, at least in part, on numerals associated with the smaller trees according to an association of trees and numerals.

Block 804 represents information of interest as a probe numeral. Here, the information of interest may be represented and/or expressed as a probe tree as discussed above. Accordingly, block 804 may represent the information of interest as a probe numeral that is associated with the probe tree according to an association of trees and numerals such as that illustrated above with reference to FIG. 4, for example. However, this is merely an example of how a probe tree may be associated with a numeral according to a particular association embodiment, and claimed subject matter is not limited in these respects. Having properties of a tree, according to a particular embodiment, a probe tree may comprise nodes which are connected by edges in addition to node and/or edge label values. In particular embodiments, a target tree may comprise large amounts of data and be much larger than a probe tree. However, this is merely a comparison of a target tree and a probe tree in a particular embodiment and claimed subject matter is not limited in these respects. Further, a probe tree comprises a root node, and may comprise one or more terminal nodes. Although claimed subject matter is not limited in this respect, block 804 may employ techniques illustrated in the aforementioned U.S. patent application Ser. No. 11/005,859 to associate a probe tree with a probe numeral according to an association of trees and numerals.

Block 806 compares the probe numeral determined at block 804 with the one or more numerals representing the target tree to find a match. If a match is found, process 800 may determine that the target tree comprises the information of interest that is represented by the probe numeral.

Figure 9:
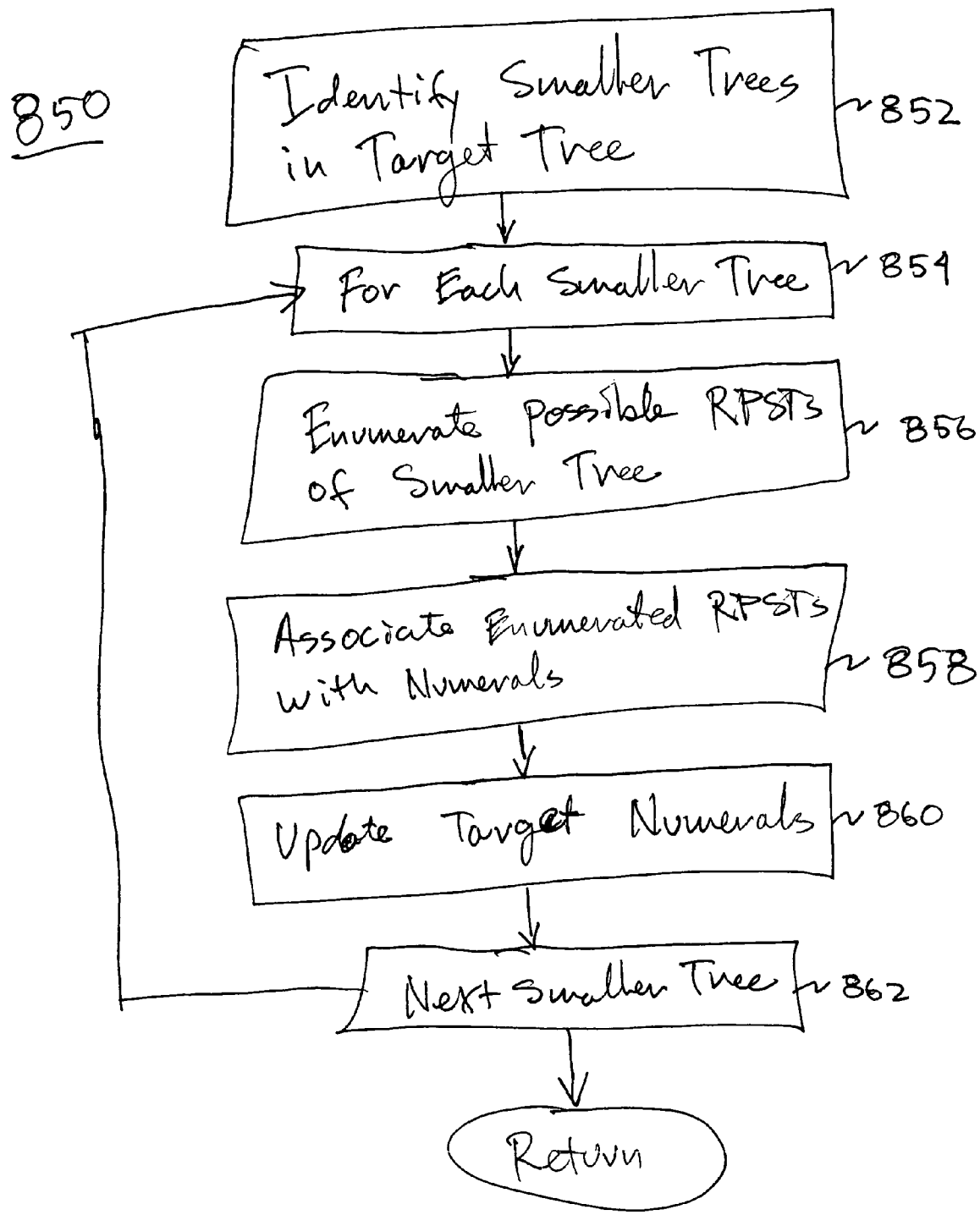
FIG. 9 is a flow diagram illustrating a process embodiment to represent a target tree as one or more numerals according to an embodiment of the process illustrated in FIG. 8.
Figure 16A:
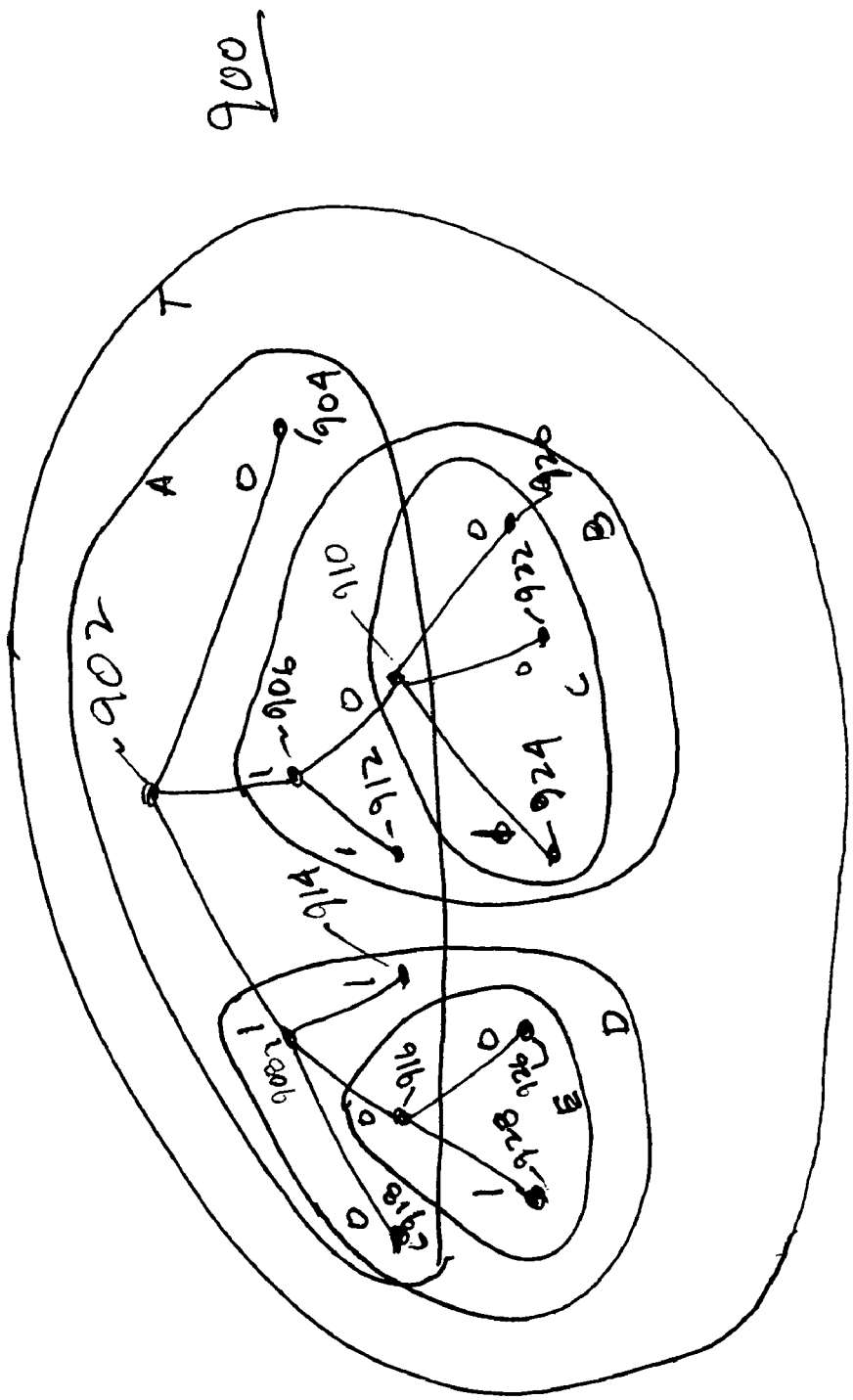
FIG. 16 is a flow diagram illustrating a process to enumerate RPSTs from a tree according to an embodiment.

FIG. 9 is a flow diagram illustrating a process embodiment 850 to represent a target tree as one or more numerals according to an embodiment of the process embodiment illustrated in FIG. 8. According to an embodiment, although claimed subject matter is not limited in this respect, process 850 may generate target numerals for an array. Block 806 (FIG. 8) may then compare the probe numeral with target numerals in the array for determining a match. Block 852 identifies smaller trees in the target tree. Process embodiment 850 generates the target numerals for the array through sequential iteration of blocks 854 through 862. Here, for each smaller tree identified at block 852, block 856 may enumerate possible RSPTs of the smaller tree as illustrated below with reference to a particular embodiment and in U.S. Provisional Patent Application No. 60/640,427, titled "Enumeration of Rooted Partial Subtrees" by Karl Schiffmann, J. J. LeTourneau and Mark Andrews, filed on Dec. 30, 2004. Block 858 may then associate the enumerated RPSTs with numerals according to an association of trees and numerals as illustrated below and in the aforementioned U.S. Provisional Application No. 60/640,427. Numerals determined at block 858 may then be combined with numerals in the array of target numerals at block 860 to provide an updated array.

Figure 10B:
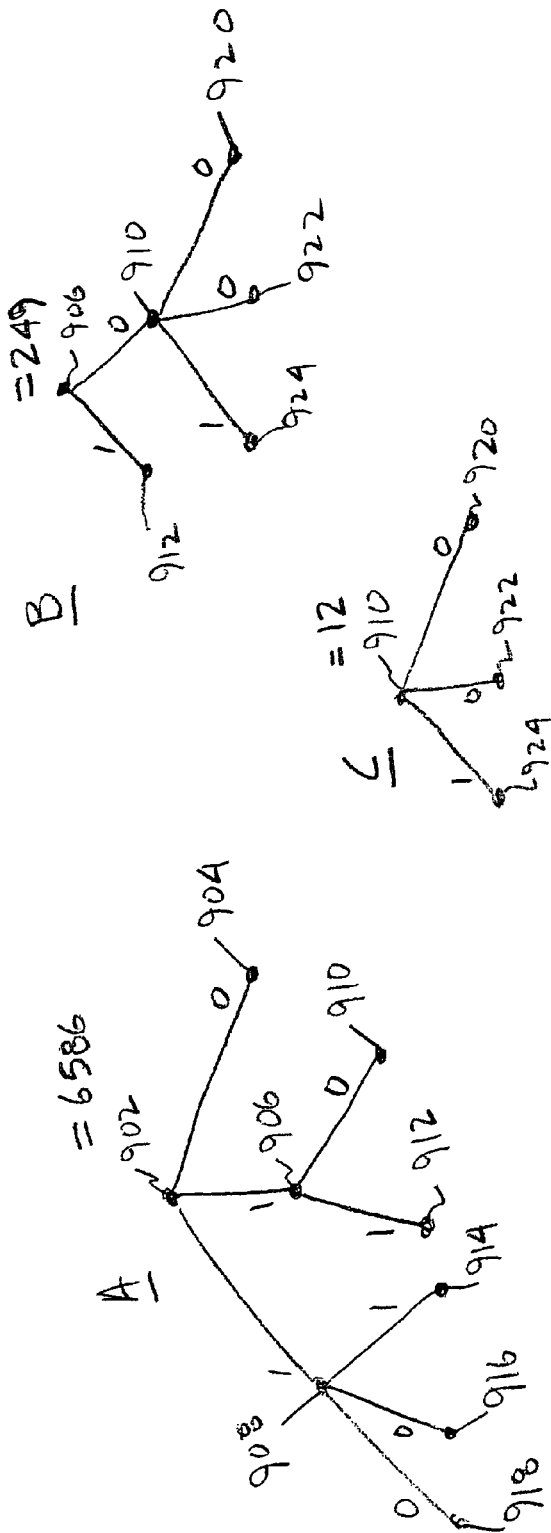
FIG. 10B is a schematic diagram of an embodiment of smaller trees of a target tree according to an embodiment of the target tree shown in FIG. 10A.

Returning to block 852 for identifying smaller trees of a target tree, in a particular example a target tree 900 shown in FIG. 10A comprises smaller trees A through E as shown in FIG. 10A and in FIG. 10B. In this particular embodiment, although claimed subject matter is not limited in this respect, tree 900 is shown comprising a BELT. However, this is merely an example of a tree of a particular type and/or configuration for a target tree, and other target trees may comprising different types and/or configurations such as, for example, node labeled trees, unlabeled and/or other edge labeled trees. In this particular embodiment, for an individual node in target tree 900 block 852 may identify smaller trees as comprising the individual node and nodes descending from the individual node up to a predetermined depth.

As illustrated below with reference to FIG. 10A, a larger target tree is expressed as a plurality of smaller trees according to a depth descending from root nodes from the smaller trees. In this particular embodiment, smaller tree may comprise a root node of the smaller trees and nodes descending from the root node up to a predetermined depth. In other embodiments, however, a target tree may be expressed as a plurality of smaller trees using other techniques. In a particular embodiment of an ordered target tree, for example, smaller trees expressing the target tree may be determined based, at least in part, on an order of nodes in the target tree. Again, these are merely examples of how a target tree may be expressed as a plurality of smaller trees and claimed subject matter is not limited in these respects.

In the particular embodiment illustrated with reference to FIG. 10A, although claimed subject matter is not limited in this respect, a smaller tree identified at block 852 may comprise the individual node and nodes descending from the individual node down to a depth of two. For example, smaller tree A comprises root node 902, nodes descending from root node 902 at a depth of one (nodes 904, 906 and 908) and nodes descending from root node 902 descending at a depth two (nodes 910, 912, 914 and 916), but does not comprising nodes descending at a depth of three (nodes 920 through 928). Block 852 may similarly identify smaller trees corresponding with other nodes in target tree 900 comprising at least one child node. In this particular example, block 852 may identify smaller tree B comprising node 906 as its root node, smaller tree C comprising node 910 as its root node, smaller tree D comprising node 908 as its root node and smaller tree E comprising node 916 as its root node.

It should be observed that smaller trees C and E, having nodes 910 and 916 as respective root nodes, comprise nodes descending from a root node at a depth of one but no nodes descending at a depth of two. Accordingly, for an individual node having at least one descendant child node, block 852 may identify a smaller tree comprising nodes descending down to the predetermined depth, to the extent that there are nodes descending from the individual node at the predetermined depth.

Figure 11:
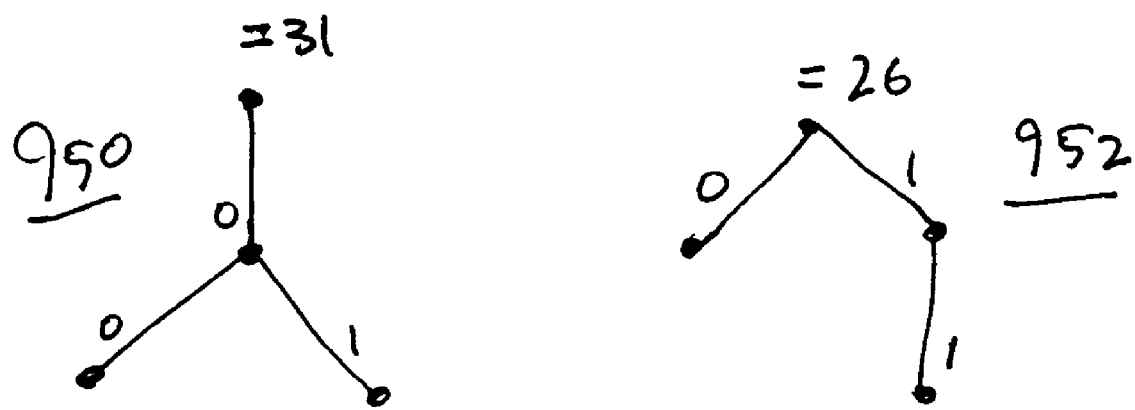
FIG. 11 is a schematic diagram of probe trees according to an embodiment.

As shown in FIG. 10A, according to a particular embodiment, smaller trees A through E are shown as overlapping in that some of the nodes in target tree 900 are a part of more than one of the smaller trees A through E. In this particular embodiment, smaller trees A through E comprise PSTs of target tree 900. Accordingly, possible PSTs of target tree 900 up to a particular depth (a depth of two in this particular example) may be identified as smaller trees in block 852. In a particular embodiment, although claimed subject matter is not limited in this respect, a depth of smaller trees may be based, at least in part, on an expected and/or maximum depth of a probe tree. Here, for example, a depth of smaller trees may be selected as a maximum depth of a probe tree to enable matching the probe tree with a smaller tree. Accordingly, in this particular embodiment, a probe numeral associated with such a maximum depth probe tree may be capable of matching one or more target numerals representing the target tree at block 806. FIG. 11 shows probe trees 950 and 952 comprising a depth of two. By identifying smaller trees of target tree 900 having up to a depth of two thus enables finding a match of probe numerals (associated with respective probe trees 950 and/or 952) with one or more numerals associated with RPSTs of smaller trees A through E.

It should be understood that the particular predetermined depth used for identifying smaller trees in this particular example is arbitrary and that other depths of one or greater may be chosen. In one particular embodiment, although claimed subject matter is not limited in this respect, a particular depth may be chosen based, at least in part, on resources available at a computing device and/or computing platform for enumerating RPSTs at block 856 and associating numerals with enumerated RPSTs at block 858. Here, for example, blocks 856 and/or 858 may be capable of performing these operations for a smaller tree having a shorter depth with fewer computing resources than for a smaller tree having a longer depth. On the other hand, as discussed above, the particular predetermined depth used for identifying smaller trees may also be based, at least in part, on an expected size of a probe tree.

While nodes of a smaller tree may be determined based, at least in part, on a depth descending from a root node of the smaller tree in particular embodiments, such nodes of a smaller tree may be determined using other techniques and claimed subject matter is not limited in this respect. In one alternative embodiment, for example, one or more nodes of a smaller tree may be determined, at least in part, on node and/or edge label values associated with the one or more nodes. Here, for example, a node descending from a root node of a smaller tree may determined to be included in the smaller tree based, at least in part, on a node and/or edge label value associated with the descending. Again, this is merely another example of how descending nodes may be determined to be included as part of the smaller tree and claimed subject matter is not limited in this respect.

Figure 10B:
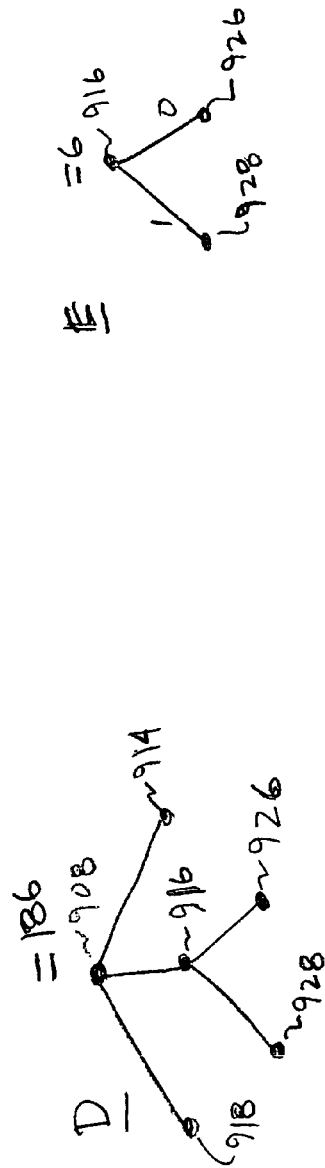

Process embodiments 800 and 850 will be illustrated by way of example with reference to FIGS. 10A, 10B and 11. Here, tree 900 comprises a target tree which expresses and/or represents hierarchical data. Trees 950 and 952, in this particular example, are probe trees representing pieces of information that are of interest. Block 802 represents the target tree 900 as one or more target numerals. Here, according to a particular embodiment, process embodiment 850 may identify smaller trees having a depth of two as A through E of the target tree 900 as illustrated above with reference to FIG. 10. Here, as illustrated in FIG. 10B, these smaller trees A through E may be associated with numerals according to the association of BELTs and numerals illustrated above with reference to FIG. 4 as follows:

| | |
|---|---|
| A | 6586 |
| B | 249 |
| C | 12 |
| D | 186 |
| E | 6 |

However, it should be understood that these are numerals associated with smaller trees A through E according to a particular association of trees with numerals and that claimed subject matter is not limited in this respect.

For a particular embodiment, a "full tree" is defined as an integral tree comprising all of its nodes, edges coupling the nodes to one another and any labels associated with the nodes or edges. Therefore, a full tree includes all of its nodes and elements completely connected. Also, such a full tree may be represented by a numeral denoted here as "FT" according to an association of trees and numerals. The notation "{RPSTs:: FT}" provides a shorthand notation for this particular embodiment to indicate the set of unique, unordered RPSTs that may be formed from a full tree "FT." In one embodiment, the elements of {RPSTs:: FT} may comprise natural numerals representing corresponding member RPSTs.

Returning to process embodiment 850, in this particular example, blocks 854 through 862 may generate an array of numerals comprising numerals associated with RPSTs of smaller trees A through E. In particular, based at least in part on numerals associated with respective smaller trees A through E according to a particular association of trees and numerals, blocks 854 through 862 may form an array of target numerals to comprise {RPSTs:: 6586} U {RPSTs:: 249} U {RPSTs:: 12} U {RPSTs:: 186} U {RPSTs:: 6}. The discussion below with reference to FIGS. 8 through 18 describes a particular embodiment of a process for enumerating RPSTs to determine member numerals for the individual expressions {RPSTs:: 6586}, {RPSTs:: 249}, {RPSTs:: 12}, {RPSTs:: 186} and {RPSTs:: 6} corresponding with smaller trees A, B, C, D and E, respectively. The discussion below with reference to FIGS. 19 through 28 illustrates a particular numerical example for determining member numerals of {RPSTs:: 249} corresponding with smaller tree B in this particular embodiment. It should be understood that the process embodiment described with reference to FIGS. 8 through 18 may be similarly applied to determine member numerals of {RPSTs:: 249} and the remaining expressions corresponding with smaller trees A, C, D and E as follows:

A: {RPSTs:: 6586}={2, 3, 6, 7, 9, 13, 14, 18, 19, 21, 26, 37, 38, 39, 42, 49, 57, 74, 78, 89, 91, 98, 111, 114, 133, 169, 178, 182, 222, 247, 259, 266, 267, 338, 481, 494, 518, 534, 623, 703, 962, 1157, 1246, 1369, 1406, 2314, 2738, 3293, 6586};

B: {RPSTs:: 249}={2, 3, 5, 6, 11, 15, 17, 31, 33, 51, 83, 93, 249};

C: {RPSTs:: 12}={2, 3, 4, 6, 12};

D: {RPSTs:: 186}={2, 3, 4, 5, 6, 10, 11, 12, 15, 22, 30, 31, 33, 62, 66, 93, 166}; and E: {RPSTs:: 6}={2, 3, 6}.

Probe trees 950 and 952, shown in FIG. 11, have a depth of two corresponding with the maximum depth of the smaller trees A through E. Returning to process embodiment 800 in this particular example, block 804 represents probe trees 950 and 952 (FIG. 11) as probe numerals. Here, probe trees 950 and 952 may be associated with numerals "31" and "26", respectively, according to an association of trees and numerals as illustrated with reference to FIG. 4 in this particular example (although probe trees 950 and 952 may be associated with different numerals according to a different association between trees and numerals). Accordingly, probe numerals determined at block 804 may comprise "31" and "26" in this particular embodiment. Here, block 806 may determine a match of probe numeral "26" with a target numeral associated with an RSPT of smaller tree A, and determine a match of probe numeral "31" with a target numeral associated with an RSPT of smaller trees B and D. A match of probe numeral "26" may be graphically observed as a match of probe tree 952 with the PST of target tree 900 (in smaller tree A) formed by nodes 902, 904, 908 and 914, and binary labeled edges connecting these nodes. Similarly, a first match of probe numeral "31" may be graphically observed as a match of probe tree 950 with a first PST of tree 900 (in smaller tree B) formed by nodes 906, 910, 920 (and/or 922) and 924, and binary labeled edges connecting these nodes. A second match of probe numeral "31" may be graphically observed as a match of probe tree 950 with a second PST of tree 900 (in smaller tree D) formed by nodes 908, 916, 926 and 928, and binary labeled edges connecting these nodes.

The embodiments described above relate to, among other things, detecting a presence of a piece of information of interest in hierarchical data represented and/or expressed as a target tree. In other embodiments, although claimed subject matter is not limited in this respect, a location of the detected piece of information of interest may be determined. Here, particular elements of a target tree (e.g., nodes, edges and/or smaller trees) may themselves be associated with particular data locations in a hierarchical database, for example. As illustrated above, target numerals may be associated with particular smaller trees formed from a larger target tree. In addition to finding a match between a probe numeral and a target numeral generated from any of the smaller trees, process 800 may also provide an indication of which smaller tree produced matching target numeral(s). In the example above, for the purposes of illustration, probe numeral "26" matches a target numeral from smaller tree A and probe numeral "31" matches target numerals from smaller trees B and D. With smaller tree A being associated with a particular location in a database, in a particular example, matching probe numeral "26" with a target numeral from smaller tree A may indicate a location of information of interest in a location of the database associated smaller tree A. Similarly, with smaller trees B and D being associated with particular locations in a database, in a particular example, matching probe numeral "31" may indicate a location of information of interest in locations of the database associated with smaller trees B and D.

In one particular example of the above described process applied to biometric pattern recognition, although claimed subject matter is not limited in this respect, a known biometric pattern (e.g., facial features) may be modeled as hierarchical data in a target tree. One or more detected features of a subject or specimen may be modeled as hierarchical data in a probe tree. One or more target numerals may represent the known biometric pattern and a probe numeral may represent the detected features. A comparison of the target numerals with the probe numerals may then indicate whether the one or more detected features are present in the known biometric pattern upon detection of one or more matches.

In another particular example, the technique described above may be used for processing queries to an extensible markup language (XML) document or set of documents. Here, hierarchical data in an XML document or set of documents may be expressed and/or represented as one or more target trees. A query to the one or more XML documents may be represented as a probe tree. Applying the techniques above, according to a particular embodiment, the target tree representing the one or more XML documents may be represented as one or more target numerals and the probe tree may be represented as a probe numeral. The probe numerals, representing the probe tree and the query, may then be compared with the one or more target numerals, representing the target tree and hierarchical data in the one or more XML documents. Detecting a match with a probe numeral with one or more of the target numeral may indicate a presence of information in the one or more XML documents that is the subject of the query. However, this is merely a particular example of an application of the above described process and claimed subject matter is not limited in this respect.

Embodiments described above with reference to FIGS. 8 through 11 employ a particular example which represents and/or expresses hierarchical data in the form of a BELT. However, process embodiments 800 and 850 may employ representations of hierarchical data in other types of trees which are associated with numerals according to an association of trees and numerals. In other embodiments, for example, a target tree and/or probe tree may comprise node labeled trees, trees with neither edge nor node labels, or m-ary edge labeled trees having edges capable of storing, holding and/or representing three or more possible values. Regardless of a particular form of a target tree and/or probe tree in any particular embodiment, a target tree may be represented as one or more target numerals according to an association of trees and numerals. Information of interest, represented by a probe tree in the particular form for example, may similarly be represented as a probe numeral for comparison with the one or more target numerals.

Figure 12:
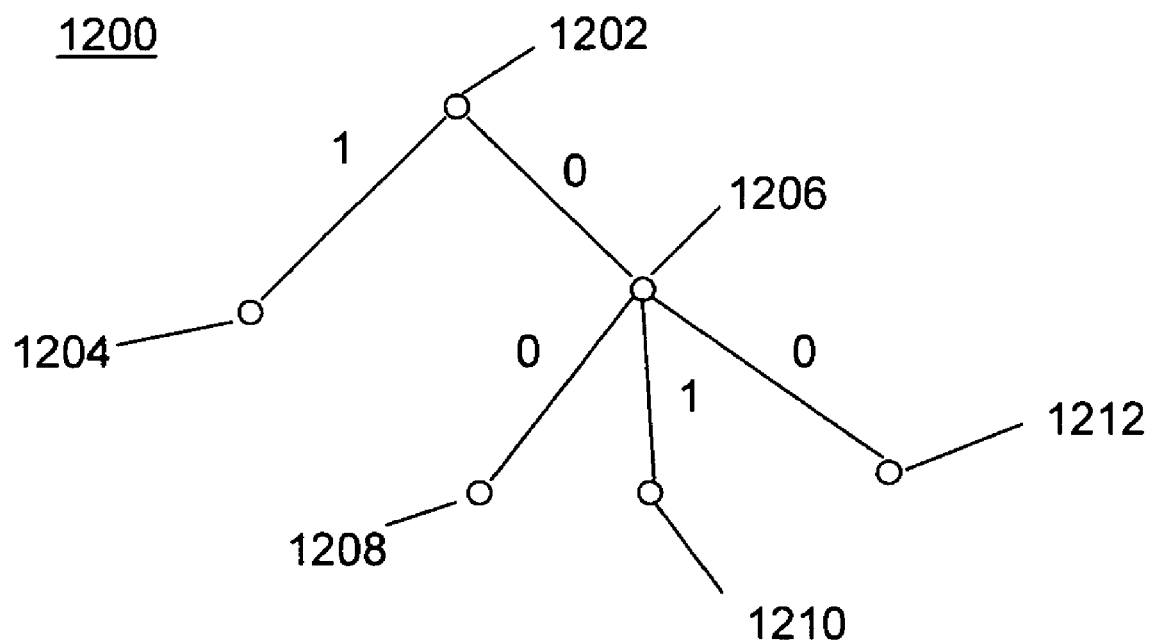
FIGS. 12 through 15 are schematic diagrams illustrating, by way of example, rooted partial subtrees (RPSTs) according to an embodiment.

FIGS. 12 through 31 illustrate an embodiment of a process to enumerate RPSTs of a tree (e.g., a smaller PST of a target tree as illustrated above). As shown in FIGS. 12 through 15, where FT represents tree 1200, elements of {RPSTs:: FT} comprise the component RPSTs shown in FIGS. 13, 14 and 15 (among other component RPSTs as illustrated below). FIG. 12 is a schematic diagram of a tree 1200 illustrating, by way of example, RPSTs of tree 1200. Tree 1200 comprises a root node 1202 and nodes 1204, 1206, 1208, 1210 and 1212 coupled to the root node 1202 by edges and intermediate nodes. In the presently illustrated embodiment, tree 1200 comprises a BELT. It should be understood, however, that other types of trees (either labeled trees or unlabeled structure trees) may similarly comprise RPSTs and that claimed subject matter is not limited in this respect.

Figure 13:
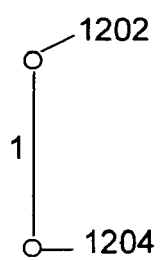
Figure 14:
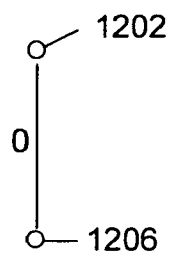
Figure 15:
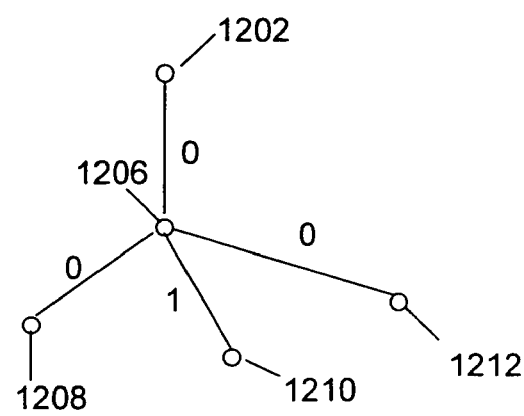

FIGS. 13, 14 and 15 are schematic diagrams of some RPSTs of tree 1200 according to an embodiment. These RPSTs include root node 1202 of tree 1200, at least one other node of tree 1200, and any edges or intermediate nodes in tree 1200 coupling the at least one other node to the root node 1202. However, it should also be understood that the set of RPSTs of tree 1200 may also include, for example, a single node 1202 or the full tree 1200. FIGS. 13 and 14 show RPSTs including root node 1202 and one other node in tree 1200 which connected via an edge in tree 1200 between root node 1202 and the one other node. FIG. 15 shows an RPST including root node 1202, nodes 1208, 1210 and 1212, and intermediate node 1206 coupling the root node 1202 to the nodes 1208, 1210 and 1212. It should be understood that FIGS. 13, 14 and 15 are merely examples of RPSTs that may be formed from tree 1200, and that these examples are not intended to provide an exhaustive enumeration of RPSTs that may be formed from tree 1200.

Figure 16:
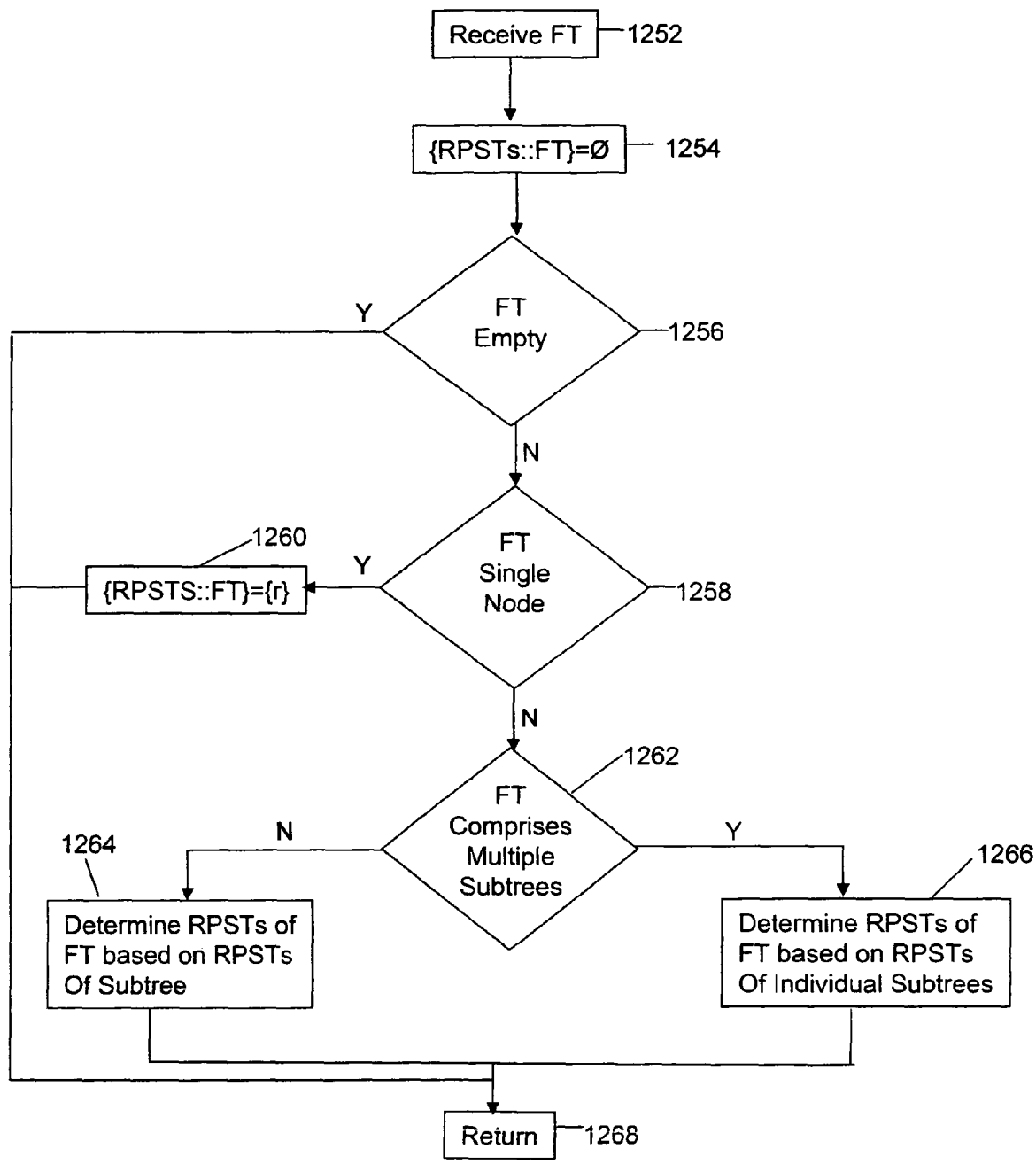

FIG. 16 is a flow diagram illustrating a process 1250 to enumerate RPSTs from a tree according to an embodiment. In this particular embodiment, the process 1250 may enumerate the RPSTs of full tree FT to define elements of {RPSTs:: FT} as a result. FT may be represented as a natural numeral received at block 1252. {RPSTs:: FT} may be initialized as the empty set at block 1254 to be subsequently filled with elements representing RPSTs enumerated in subsequent portions or process 1250.

According to an embodiment, the process 1250 recognizes that the full tree may represent any one of four different configurations: an empty tree; a single node tree; a tree comprising a single subtree connected to a root node of the full tree by an edge; and two or more subtrees connected to the root node of the full tree by respective edges. Accordingly, the process 1250 enumerates the RPSTs of the full tree based, at least in part, on the particular configuration of the full tree. Diamond 1256 determines whether FT represents an empty tree containing no nodes. If so, {RPSTs:: FT} remains defined as the empty set and process 1250 terminates at block 1268. If diamond 1258 determines that FT contains a single node tree, block 1260 updates {RPSTs:: FT} to include a natural numeral expressing a single node tree (here, {r}).

At diamond 1262 through block 1268, process 1250 enumerates RPSTs based, at least in part, on the configuration of the full tree as having either a single subtree connected to the root node of the full tree by an edge, or two or more subtrees connected to the root node by respective edges. If FT represents a single subtree connected to the root node of the full tree by an edge, block 1264 enumerates the RPSTs of the single subtree. Here, the RPSTs of the full tree may be determined, at least in part, from the RPSTs of the single subtree.

If FT represents a full tree having two or more subtrees connected to the root node of the tree by respective edges, block 1266 may enumerate the RPSTs of the individual ones of the two or more subtrees. At least some of the RPSTs of the full tree may be determined, at least in part, from RPSTs of the individual subtrees. Block 1266 may then enumerate additional RPSTs of the full tree based, at least in part, combinations of the enumerated RPSTs merged at the root node of the full tree.

According to an embodiment, blocks 1264 and 1266 may be carried out by recursive execution of at least a portion of the process 1250. At block 1264, for example, the single subtree of the full tree may itself comprise two or more subtree children connected by respective edges to a node. Block 1264 may execute portions of block 1266 to enumerate the RPSTs of the subtree based, at least in part, on RPSTs enumerated from individual ones of the subtree children of the single subtree. Similarly, block 1266 may enumerate RPSTs of individual ones of the subtrees connected to the root node of the full tree by executing portions of block 1264.

Figure 17:
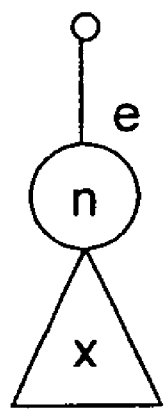
FIG. 17 is a schematic diagram illustrating a representation of an embodiment of a subtree according to an embodiment.

FIG. 17 is a schematic diagram illustrating a representation an embodiment of a subtree comprising an edge having a label "e" with a subtree root node having a label "n" where "e" and "n" may be represented by discrete values (e.g., Boolean, binary, integer, natural numeral and/or whole numeral values). A value associated with a "child tree" of the subtree may be represented by "x" which may represent information expressed as a natural numeral according to an association of natural numerals with trees as illustrated above with reference to FIG. 4. Like a tree, subtree and RPST, such a child tree may have properties of a tree and be associated with a natural numeral according to an association between trees and natural numerals. However, this is merely an example of a representation of a subtree and its child tree, and claimed subject matter is not limited in this respect.

As described below in connection with relation (1), a push operation may define a relationship between a subtree and a child tree of the subtree. As an association between trees and natural numerals may associate particular trees with natural numerals (e.g., as illustrated in FIG. 4), a push operation may define a relationship between a natural numeral associated with a subtree and a natural numeral associated with a child tree of the subtree. Similarly, a push operation may also define a relationship between natural numerals representing RPSTs of the child tree and natural numerals associated with at least some of the RPSTs of the subtree. A value of, or natural numeral associated with, the subtree shown in FIG. 17 may be expressed as the result of a push operation on the child tree having the value x. Such a push operation on the child tree may be represented in relation (1) as follows:

$$\text{push}(j,k,x) = P[kx+j-k+(2-r)], \text{ if } j<k \text{ and } k>0 \quad (1)$$

where:
P(m)=Kleene enumeration function for generating a sequence of non-composite numerals illustrated with reference to FIG. 5;
k=total number of values possible for a label;
j=actual computed label index value;
x=value of, or natural numeral associated with, "pushed" child tree; and
r=defined value of tree system root/single node tree (e.g., either 0 or 1).

It should be understood that while the push operation of relation (1) is suitable for performing specific embodiments described herein, this push operation is merely an example of how a push operation may be performed and claimed subject matter is not limited in this respect. Additionally, it should be noted that the value of "r" is selected based upon a particular association of natural numerals and trees according to an association embodiment. Here, such an association of natural numerals may define a particular natural numeral to represent a tree comprising a single node. In the association of natural numeral with trees of FIG. 4, for example, the single node is associated with "1" defining r=1. However, this is merely an example of how a natural numeral may represent a single node for a particular association embodiment and claimed subject matter is not limited in this respect.

It should also be noted that "j" (the actual computed label index value associating the root node with the pushed subtree) is a function of the specific values of "e" (the specific edge label) and "n" (the specific node label). In the particular case of a BELT, for example, there may be no node values such that "j"="e". The value of "k" (total number of possible index values) may be determined as function of the possibilities of values of "e" (edge label value) and "n" (node label value) and, in a particular embodiment, "k" may be determined as the number of possibilities for "e" multiplied by the number of possibilities for "n." Again, in the particular case of a BELT, "k" equals the number of possibilities for the value "e" since there are no node labels.

The techniques described herein for enumerating RPSTs of a full tree may be applied to any particular type of tree. For illustration purposes, particular examples described herein are directed to enumerating RPSTs of a BELT. Accordingly, while it is understood that an actual computed index value associating the root node with the pushed subtree may be determined from node labels (having a value "n") and/or edge labels (having a value "e"), for simplicity the remaining discussion will denote the actual computed label index value "j" as an edge label value of an edge connecting a root node of a tree to a pushed child tree.

In enumerating at least some RPSTs of a tree based, at least in part, on enumerated RPSTs of a subtree of the RPST, it may be useful to express a push operation on multiple RPSTs in a single push operation. In addition to applying a push operation to a tree having a value x, the push operation may be applied to multiple trees or tree elements of a set (here, an unordered collection of elements representing trees, RPSTs, subtrees and/or child trees of a subtree) in relation (2) as follows:

$$\text{push}[j,k,\{a,b,c\}] = \{\text{push}(j,k,a)\} \cup \{\text{push}(j,k,b)\} \cup \{\text{push}(j,k,c)\} \quad (2)$$

where a, b and c are numerical representations of tree elements in the pushed set. The result of the operation of relation (2) may be referred to as a "pushed set" of tree elements.

Figure 18:
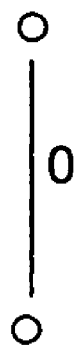
FIGS. 18 and 19 are schematic diagrams illustrating applications of one embodiment of a push operation according to an embodiment.
Figure 19:

FIGS. 18 and 19 illustrate applications of the push operation of relation (1) to specific subtrees. FIG. 18 shows a BELT having a value of "2" according to the association of trees and natural numerals shown in FIG. 4. As such, a push operation on this tree would define x=2, k=2 and r=1. FIG. 19 illustrates the result of a push of the tree in FIG. 18 by an edge having a label zero (i.e., a zero-push). The value of j for this push operation is zero. Accordingly, the push operation provides a numeral associated with the pushed BELT as follows:

$$\text{push}(j,k,x) = P[2*2+0-2+2-1] = P[3] = 5.$$

It should be understood, however, the application of the push operation of relation (1) to a BELT as illustrated in FIGS. 18 and 19 are merely particular examples of the push operation and the push operation may be similarly applied to non-BELT trees.

To enumerate RPSTs of a subtree of a full tree, it may be useful to determine a numeral associated with a child tree of the subtree based, at least in part, on a numeral associated with the subtree (the natural numerals being based, at least in part, on an association between trees and numerals). Like the push operation of relation (1), according to an embodiment, an "inverse push" operation may define a relationship between a subtree (e.g., a subtree of a parent full tree) and the child tree of the subtree (as illustrated in FIG. 13). Here, such an inverse push operation may define a relationship between numerals associated with such subtrees and numerals associated with respective child trees of such subtrees. Operating on such a natural numeral associated with a subtree (according to an association of trees with natural numerals as illustrated with reference to FIG. 4, for example), an inverse push operation may provide a natural numeral associated with a child tree portion. In a particular embodiment, an inverse push operation may provide as a result as (1) a natural numeral representing a child tree ("Child") and an edge label value linking the child tree with the root node of the parent full tree ("j"). For example, an inverse push operation on a tree may be represented in relation (3) as follows:

$$push^{-1}(r,k,ST) = <Child, j>$$

$$Child = Int[(P^{-1}(ST) + k - (2-r))/k]; \text{ and}$$

$$j = [P^{-1}(ST) + k - (2-r)] \text{modulo}[k] \quad (3)$$

where:
$P^{-1}(h)$=an inverse of the Kleene enumeration function for generating a sequence of non-composite numbers illustrated with reference to FIG. 5;
ST=value of, or natural numeral associated with, subtree with edge label value "j";
Child=natural numeral representing child tree of subtree represented by ST;
j=edge label value linking the child tree with the root node of parent full tree;
k=total number of possible edge label index values linking the child tree with the root node of parent full tree; and
r=defined value of tree system root/singleton node (either 0 or 1).

It should also be understood that the inverse push operation of relation (3) is merely an example of an inverse push operation used to determine a natural numeral associated with a child tree based, at least in part on a natural numeral associated with a parent subtree, and that claimed subject matter is not limited in this respect. For example, for simplicity relation (3) assumes that information of a computed index value "j" associating the root node of the parent full tree and the child tree may be derived from edge label values in the absence of node label values (e.g., as in the case of a BELT). However, relation (3) may be expanded to apply to other non-BELT trees. Applied to the tree of FIG. 17, for example, the inverse push operation of relation (3) may be expanded to yield a natural numeral representing the child tree as the value "x" and the label index value j (being a function of edge and node label values "e" and "n").

In the particular embodiment of an inverse push operation illustrated in relation (3), the inverse Kleene enumeration function, $P^{-1}(h)$, provides a result based upon ST (value of, or natural numeral associated with the subtree). Since the Kleene enumeration function generates non-composite natural numerals, the domain of $P^{-1}(h)$ may be limited to non-composite natural numerals. In connection with the association of natural numerals and trees illustrated with reference to FIG. 4, accordingly, the inverse push operation of relation (3) may be applied to natural numerals representing trees having a root node coupled to a single node (or having a single subtree connected to the root node). In one particular implementation of the inverse of the Kleene enumeration function, $P^{-1}(h)$, a look-up table may associate values of h and $P^{-1}(h)$ as shown in Table 1 as follows:

TABLE 1

| h | $P^{-1}(h)$ |
|---|---|
| 2 | 1 |
| 3 | 2 |
| 5 | 3 |
| 7 | 4 |
| 11 | 5 |
| 13 | 6 |
| 17 | 7 |
| 19 | 8 |
| 23 | 9 |
| 29 | 10 |
| 31 | 11 |
| 37 | 12 |
| 41 | 13 |
| 43 | 14 |
| 47 | 15 |
| 53 | 16 |
| 59 | 17 |
| 61 | 18 |
| 67 | 19 |
| 71 | 20 |
| 73 | 21 |
| 79 | 22 |
| 83 | 23 |

To enumerate at least some of the RPSTs of a full tree having two or more subtrees connected to the root node of FT by different edges, it may be useful to determine combinations of RPSTs enumerated from the different subtrees. In the case of a full tree comprising two subtrees connected to the root node by two edges, in a particular example, individual elements of a first set of RPSTs of the full tree derived from a first subtree (denoted as "X" for the purposes of illustration) may be combined or merged with individual elements of a second set of RSPTs of the tree derived from a second subtree (denoted as "Y" for the purposes of illustration). Here, the elements of X and Y may represent individually enumerated RPSTs of the tree derived from the first and second subtrees, respectively. In a particular embodiment, the elements of X and Y may be represented as natural numerals associated with enumerated RPSTs derived from the respective first and second subtrees (according to an association of trees and natural numerals as illustrated in FIG. 4, for example). Accordingly, a merger of an RPST represented by an element in X with an RPST represented by an element in Y at the root node of the tree may be represented by a multiplication of these natural numerals resulting in a natural numeral representing the RPST resulting from the merger.

Figure 20:
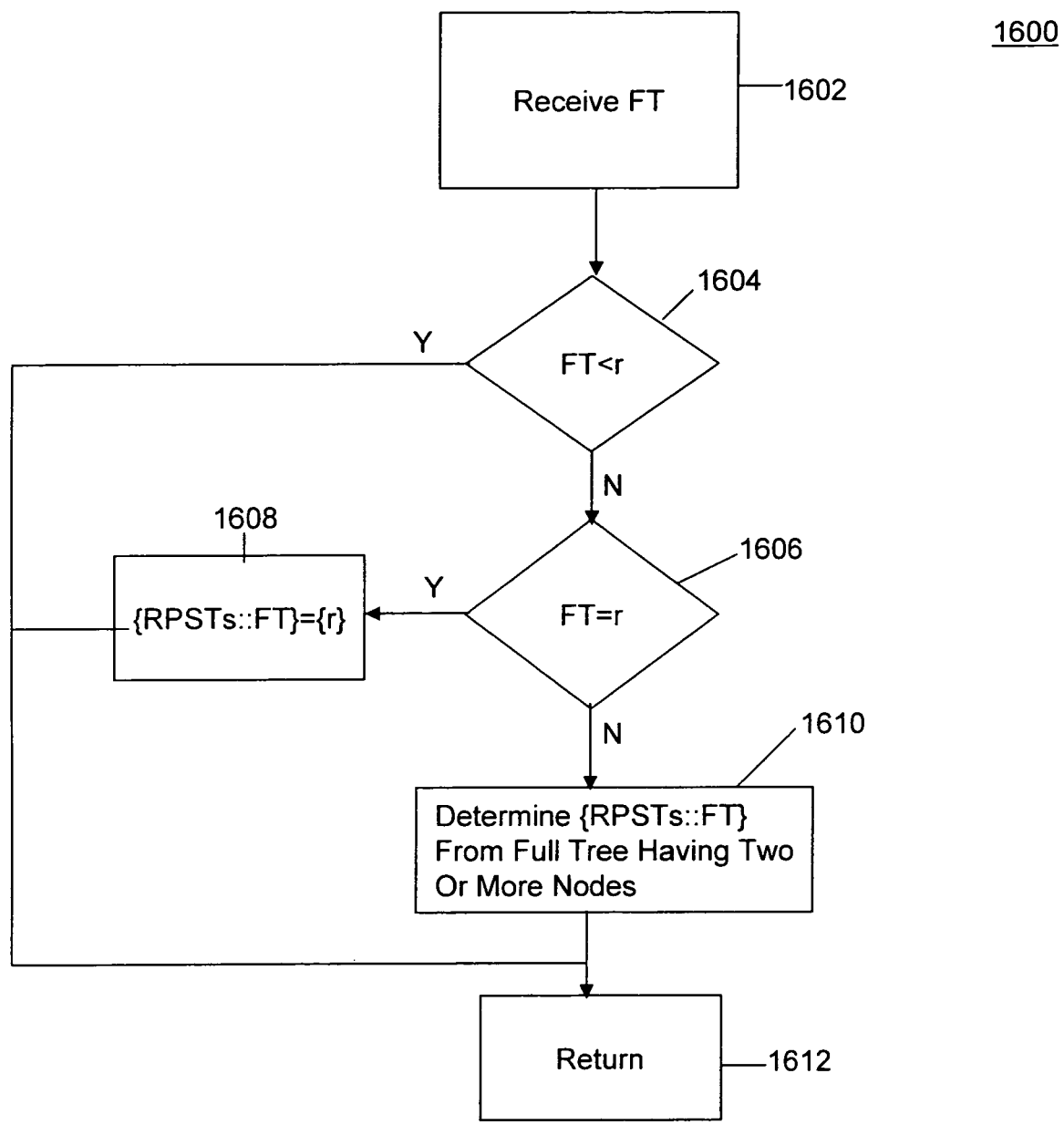
FIGS. 20, 21 and 22 are flow diagrams illustrating a process to enumerate RPSTs from a tree according to an embodiment.
Figure 21:
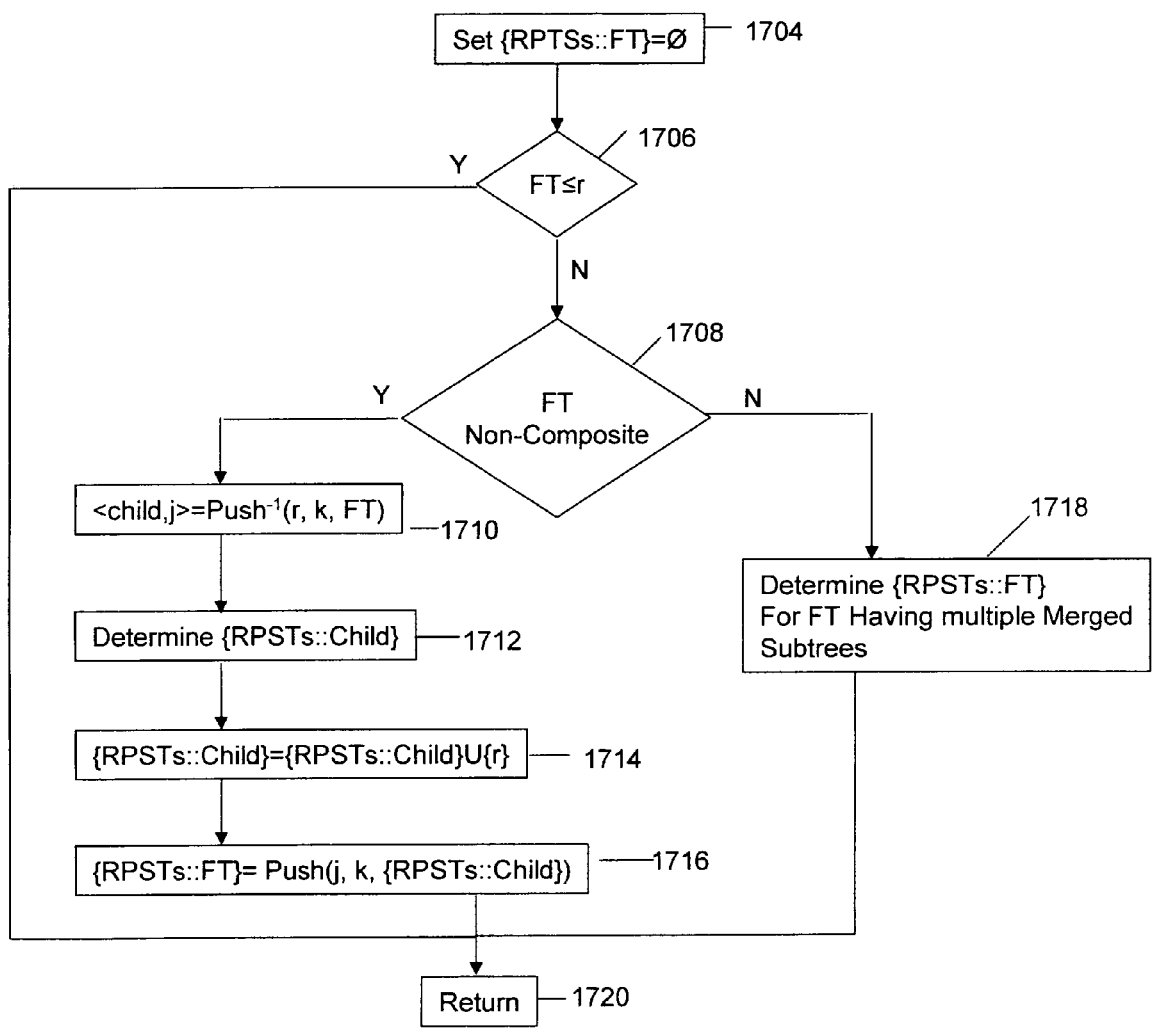
Figure 22:
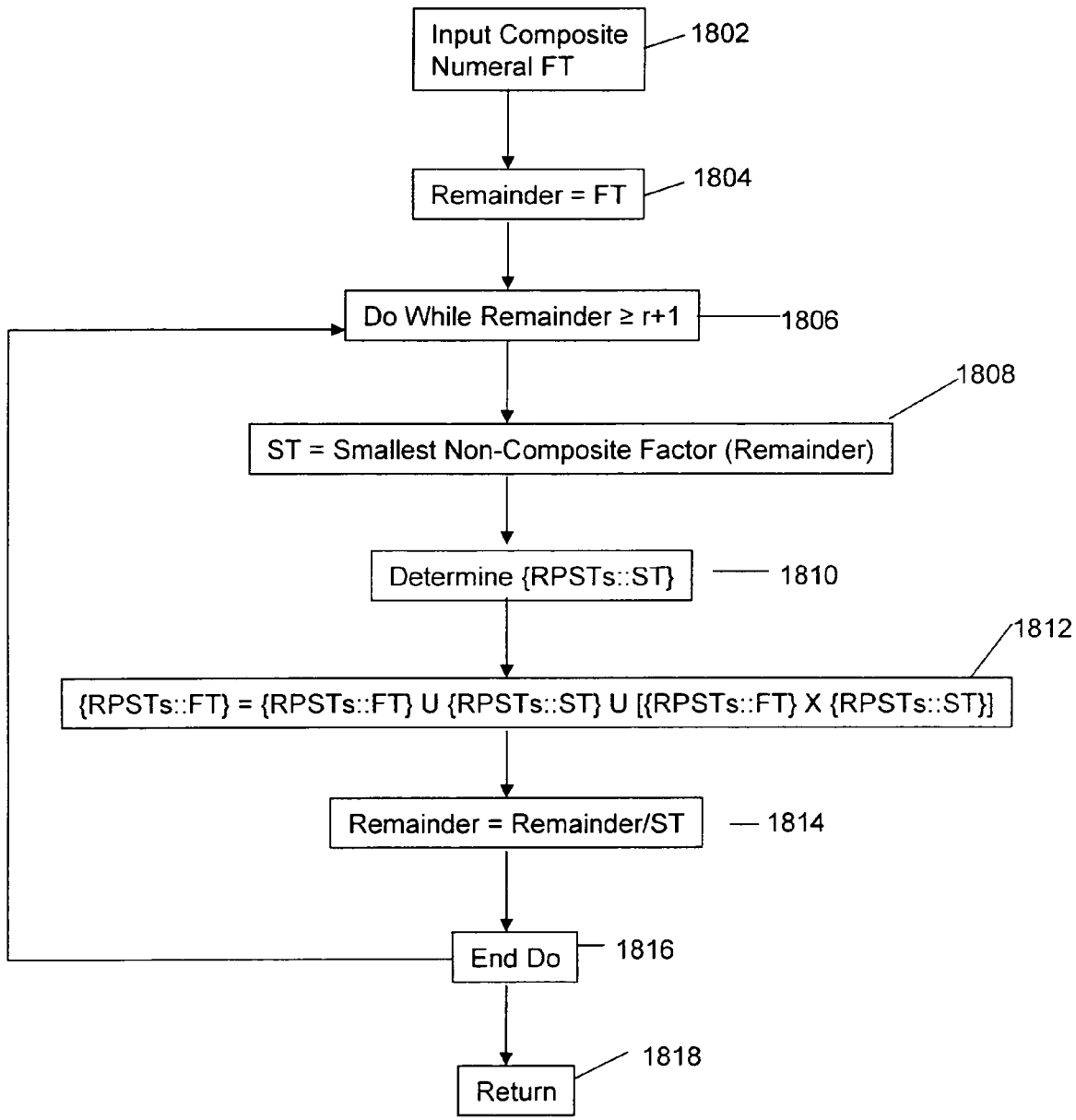

According to one embodiment, a merger operation discussed above (e.g., for combining trees at their root nodes to provide a graphical and numerical expression of the resulting merged trees) may be expanded to create a set merger operation to include a merger among RPSTs (e.g., derived from different subtrees as illustrated above). Here, a member RPST of a first set merges with a member RPST of a second set to provide a member of a third, merged set containing the merged RPSTs as elements, for all members of both first and second sets. Regarding the aforementioned representation of the RPSTs as natural numerals, the set merger operation to merge sets X and Y may be expressed as follows:

$$XxY = \{x_1, x_2, x_3, \ldots, x_n\} \times \{y_1, y_2, y_3, \ldots, y_m\} = \qquad (4)$$
$$= \{x_1 * y_1, x_1 * y_2, x_1 * y_3, \ldots, x_1 * y_m\} U \{x_2 * y_1, x_2 * y_2,$$
$$x_2 * y_3, \ldots, x_1 * y_m\} U \{x_3 * y_2, x_3 * y_2, x_3 * y_3, \ldots, x_3 * y_m\}$$
$$U \ldots U \{x_n * y_1, x_n * y_2, x_n * y_3, \ldots, x_n * y_m\}$$

where:

$x_1, x_2, X_3, \ldots X_n$ are the natural numerals representing RPSTs in set X; and $y_1, y_2, y_3, \ldots y_m$ are the natural numerals representing RPSTs in set Y;

FIGS. 20, 21 and 22 are flow diagrams illustrating a process to enumerate RPSTs from a full tree which applies the aforementioned push operations, inverse push operation and set merger operation of relations (1) through (4) according to a particular embodiment. FIG. 20 illustrates a process 1600 to receive a natural numeral representing a full tree, FT, at block 1602. Diamond 1604 may determine whether the tree represented by FT comprises an empty tree. In this particular embodiment, the value "r" is zero or one depending on whether a single node tree is associated with a value of zero or one (e.g., depending on a particular association embodiment defined above in connection with the push operation of relation (1)). Here, diamond 1604 determines whether the tree represented by FT is an empty tree based upon whether FT is less than r. However, this is merely an example of a technique to identify an empty tree and claimed subject matter is not limited in this respect. Process 1600 terminates at block 1612 if diamond 1604 determines that FT represents an empty tree. Diamond 1606 determines whether FT represents a single node tree based upon whether FT equals r. However, this is merely an example of a technique to identify a single node tree and claimed subject matter is not limited in this respect. If FT comprises a single node tree, block 1608 assigns r as the RPST element of {RPSTs:: FT} and the process 1600 terminates at block 1612.

Diamond 1606 determines whether FT comprises two or more nodes by determining whether FT is greater than r. If so, block 1610 may initiate execution of process 1700 shown in FIG. 21. Block 1704 initializes the set {RPSTs:: FT} to contain no elements while execution of the remaining portions of process 1700 may subsequently add elements to this set. As discussed below, process 1700 may be recursively executed to determine, for example, RPSTs of subtrees of the full tree represented by FT. Accordingly, diamond 1706 determines, much like diamond 1606 of process 1600, whether FT (e.g., in a recursive execution) represents a single node tree. If so, then process 1700 (and process 1600) terminate at block 1720.

If FT is greater than r, diamond 1708 determines whether FT represents a tree comprising a single subtree (e.g., comprising a child tree pushed from the full tree node by an edge as shown in FIG. 17) or a tree comprising a root node that merges two or more subtrees (e.g., as shown in FIG. 12). Here, diamond 1708 determines that FT represents a tree comprising a single subtree if FT comprises a non-composite numeral, and determines that FT represents a tree having a root node merging two or more subtrees if FT comprises a composite numeral. For this embodiment, an association between trees and natural numerals may associate composite natural numerals with trees merging two or more subtrees at a root node, and may associate non-composite numerals with trees comprising a single subtree (here, a pushed child tree coupled to the root node of the tree by an edge). However, this is merely an example of an association embodiment, and claimed subject matter is not limited in this respect.

Similar to the process 1250 illustrated above with reference to FIG. 16, process 1700 employs a process to enumerate the RPSTs of a full tree based, at least in part, on the configuration of the full tree. Here, it should be observed that block 1710 through 1716 collectively represent a process of enumerating RPSTs of a full tree having a single subtree connected to the root node of the full tree by a single edge. Process 1700 may employ a different process at block 1718 if the full tree comprises two or more subtrees merged at a root node. As illustrated below, the RPSTs of a full tree may be determined, at least in part, by an enumeration of RPSTs of child trees of subtrees. Accordingly, the process 1700 of enumerating RPSTs of a full tree may be recursively executed for determining such RPSTs of the child trees.

If diamond 1708 determines that FT represents a tree comprising a single subtree connected to a root node by a single edge, block 1710 executes an inverse push operation on FT as illustrated above in relation (3) to determine a natural numeral "child" representing the child tree coupled to the root node of the tree represented by FT (and edge label value "j" linking the root node with the child tree). At least some of the RPSTs of the tree represented by FT may be derived from RPSTs of the child tree determined at block 1710. Accordingly, block 1712 may recursively execute process 1700 to enumerate the RPSTs of the child tree ({RPSTs:: child}). Here, the recursively executed process may apply the natural numeral "child" representing the child tree (e.g., as determined at block 1710) as the FT input value. Block 1714 then combines the single node tree represented by "r" with the set of enumerated RPSTs determined at block 1712. Block 1716 then performs a push operation according to relation (2) on the elements of this combined set {RPSTs:: child} to complete the enumeration of the elements of {RPSTs:: FT} in a pushed set with the edge label value "j" determined from the inverse push operation at block 1710.

If diamond 1708 determines that FT represents a tree comprising a root node that merges two or more subtrees, block 1718 may enumerate the elements of {RPSTs:: FT} by executing a process 1800 shown in FIG. 22. As such, block 1718 may provide the composite numeral FT as an input value to process 1800 at block 1802. Subsequent blocks 1804 through 1818 may then enumerate RPSTs for individual subtrees merged at the root node of the tree represented by FT, and determine {RPSTs:: FT} from combinations of the RPSTs enumerated from particular ones of the merged subtrees.

A processing loop of blocks 1806 through 1816 incrementally factors the composite numeral FT into non-composite numerals "ST" representing individual subtrees merged at the root node of the tree represented by FT. Again, this particular embodiment includes an association between trees and natural numerals that associates composite natural numerals with trees merging two or more subtrees at a root node and associates non-composite numerals with trees having a root node coupled to a single pushed subtree; however, claimed subject matter is not limited in scope to this particular embodiment. Here, block 1804 initializes a "remainder" as FT and block 1808 determines the non-composite numeral ST as the smallest non-composite factor of the remainder. If the remainder is decreased to below r, representing a single node tree in this particular embodiment), sequential execution returns to process 1700 at block 1818.

Through successive executions of the processing loop of blocks 1806 through 1816, block 1808 may sequentially factor the numeral FT into non-composite numerals representing subtrees of the tree represented by FT and connected to a root node of FT. According to a particular association embodiment, these non-composite numerals may represent individual ones of subtrees merged at a root node of the tree represented by FT. As at least a portion of the RPSTs of the tree represented by FT may be determined from the RSPTs of these subtrees, block 1810 may recursively execute the process 1700 to enumerate the RPSTs of the subtrees represented by the non-composite values ST determined at block 1808.

It should be observed that the elements of {RPSTs:: FT} are derived from the RPSTs enumerated from individual subtrees (determined through loop iterations of block 1810). In addition to these elements, {RPSTs:: FT} also includes merged combinations of RPSTs derived from RPSTs enumerated from different subtrees at block 1810 in different loop iterations. Through executions of the loop of block 1806 through 1816, block 1812 updates {RPSTs:: FT}. By way of example, for the purpose of illustration, in an initial iteration of the loop, block 1812 may merely assign elements to {RPSTs:: FT} (which is initialized as the empty set) to include the RPSTs enumerated at block 1810 from a first subtree of the tree represented by FT. In a second iteration of the loop, block 1810 enumerates RPSTs of a second subtree of the tree represented by FT. In addition to adding the enumerated RPSTs of the second subtree to {RPSTs:: FT} (updated in the initial loop iteration to include RPSTs enumerated from the first subtree), block 1812 in the second iteration also updates {RPSTs:: FT} to include RPSTs formed from the merger of the current individual elements of {RPSTs:: FT} (again, updated from the initial iteration) with individual enumerated RPSTs of the second subtree. Here, block 1812 employs a set merger operation according to relation (4) to determine a merger of the current individual elements of {RPSTs:: FT} (e.g., assigning the elements of {RPSTs:: FT} to "X") with the individual elements of the enumerated RPSTs of the second subtree (e.g., assigning the elements of RPSTs of the second subtree to "Y"). Subsequent iterations of the processing loop of blocks 1806 through 1816 may then enumerate the RPSTs of additional subtrees, and update {RPSTs:: FT} based upon the elements of {RPSTs:: FT} updated in the previous iteration and the enumerated RPSTs of the subsequent subtree children in like fashion.

Figures 23, 24, 25, 26, 27, 28, 29:
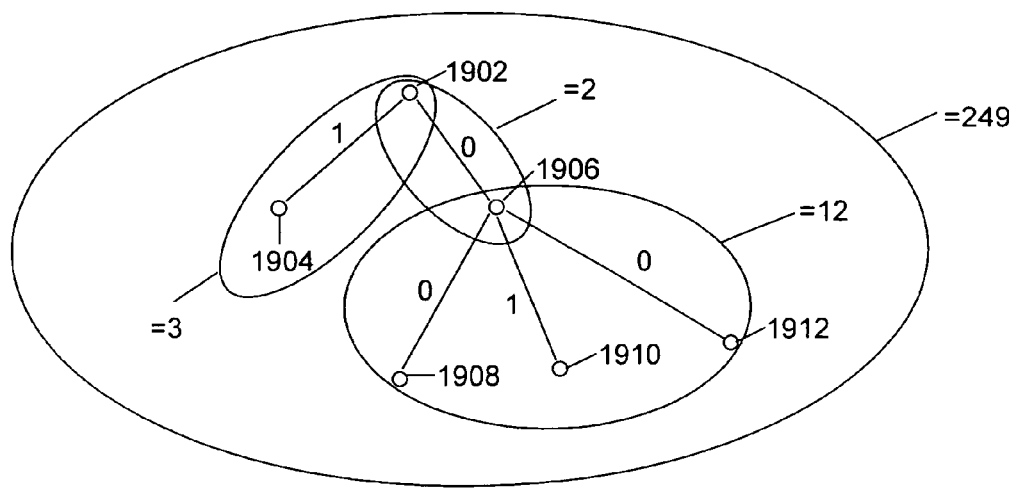
FIGS. 23 through 31 are schematic diagrams illustrating, by way of example, a process to enumerate RPSTs from a tree according to an embodiment.

FIGS. 23 through 31 are schematic diagrams of trees illustrating a specific example of enumerating RPSTs of a tree according to the process embodiments of FIGS. 20, 21 and 22. FIG. 23 shows a tree 1900 which comprises a BELT for this particular illustration of an embodiment, however, it should be understood that the processes described for enumerating RPSTs are applicable to non-BELT trees as well, and that claimed subject matter is not limited in this respect.

Tree 1900 may be represented as a numeral "249" according to an association of trees and natural numerals as described above with reference to FIG. 4, for example. As tree 1900 comprises two or more subtrees merged at a root node 1902, the natural numeral 249 comprises a non-composite natural numeral. Commencing execution of process 1600 for determining {RPSTs:: 249}, block 1602 defines FT=249. Since tree 1900 comprises a BELT in this particular embodiment, the value of "r" may be "1" consistent with the application of the push operation of relation (1). Accordingly, diamonds 1604 and 1606 direct initiating execution of process 1700 through block 1610.

Block 1704 initializes {RPSTs:: 249} as an empty set to be subsequently filled with natural numerals representing RPSTs of tree 1900. Since 249 (here, FT) comprises a composite natural numeral, block 1718 may initiate an instance of process 1800. Block 1804 initializes "remainder"=249 and block 1808 determines ST to be the natural numeral 3 (since 249 may be factored into two non-composite numerals 3 and 83).

Block 1810 may initiate a first recursive instance of process 1700 while providing FT=ST=3 as an input value, diamond 1708 determines that 3 is a non-composite numeral. Block 1710 performs an inverse push operation according to relation (3) to determine a natural numeral representative of the child tree of the subtree corresponding to the natural numeral 3 and an edge label value of an edge linking the child tree with the root node as follows:

$$\text{push}^{-1}(r=1, k=2, ST=3) = <\text{child}, j> \quad (5)$$

$$\text{child} = Int[(P^{-1}(3) + 2 - (2-1))/2]$$
$$= Int[(2 + 2 - (2-1))/2]$$
$$= 1$$

$$j = [(P^{-1}(3) + 2 - (2-1)] modulo[2]$$
$$= [(2 + 2 - (2-1)] modulo[2]$$
$$= 1$$

Block 1712 initiates execution of a second recursive instance of process 1700, initializing {RPSTs:: child}=Ø and terminating at block 1720 through diamond 1706 (since child=1≦r). Returning to block 1714 of the first recursive instance of process 1700, {RPSTs:: child} is updated to be {r}={1} for this particular case of a BELT. Block 1716 then performs a push operation on the elements of the set {r} according to relation (2) (applying the edge label value j=1 as determined in relation (5) for block 1710) to provide an RPST, {3}, which is graphically illustrated in FIG. 24.

Execution of the initial instance of process 1800 then returns to block 1812 for updating {RPSTs:: FT} by including {RPSTs:: ST} (={3} as determined above) and merged combinations of the enumerated {RPSTs:: ST} with any other previously enumerated RPSTs according to relation (4). Since {RPSTs:: FT} at this point comprises an empty set, block 1812 merely updates {RPSTs:: FT} to include the single element of {RPSTs:: ST}. Block 1814 updates the remainder as FT/ST=249/3=83. This numeral corresponds to a subtree of tree 1900 formed by nodes 1902, 1906, 1908, 1910 and 1912 graphically illustrated as subtree 2100 in FIG. 25.

On a second iteration of the processing loop of blocks 1806 through 1816, block 1808 determines the non-composite factor of the remainder updated at block 1814 of the first iteration of the processing loop. Here, the natural numeral remainder, 83 as determined at block 1814 in the first iteration, comprises a non-composite numeral. Accordingly, block 1808 determines the natural numeral ST of the current iteration to be 83. Block 1810 then determines {RPSTs:: 83} by initiating a third recursive instance of process 1700. Since 83 is a non-composite natural numeral (as determined at diamond 1708), block 1710 determines the inverse push of 83 according to relation (3) as follows:

$$\text{push}^{-1}(r=1, k=2, ST=83) = <\text{child}, j> \quad (6)$$

$$\text{child} = Int[(P^{-1}(83) + 2 - (2-1))/2]$$
$$= Int[(23 + 2 - (2-1))/2]$$
$$= 12$$

-continued $$j = [(P^{-1}(83) + 2 - (2 - 1)]modulo[2]$$
$$= [(23 + 2 - (2 - 1)]modulo[2]$$
$$= 0$$

The result of this inverse push operation is graphically illustrated in FIG. 26 which includes a child tree 2200 of the subtree 2100 formed by the nodes 1906, 1908, 1910 and 1912. Block 1712 then determines {RPSTs:: 12} by initiating a fourth recursive instance of process 1700 (setting FT=child=12). Since the natural numeral "12" is a composite numeral (representing a tree which merges subtrees at a root node), block 1718 may determine {RPSTs:: 12} by initiating a first recursive instance of process 1800. As block 1804 sets remainder="12", block 1808 determines ST (the natural numeral representing a first merged subtree) as "2." Block 1810 may then determine {RPSTs:: 2} by initiating a fifth recursive instance of process 1700. Here, since "2" is a non-composite numeral (as determined at diamond 1708), block 1710 may determine the inverse push of "2" according to relation (3) as follows:

$$push^{-1}(r = 1, k = 2, ST = 2) = <child, j> \quad (7)$$
$$child = Int[(P^{-1}(2) + 2 - (2 - 1))/2]$$
$$= Int[(1 + 2 - (2 - 1))/2]$$
$$= 1$$
$$j = [(P^{-1}(2) + 2 - (2 - 1)]modulo[2]$$
$$= [(1 + 2 - (2 - 1)]modulo[2]$$
$$= 0$$

Block 1712 may initiate a sixth recursive instance of process 1700 to determine {RPSTs:: 1}. Diamond 1706 of the sixth recursive instance of process 1700 may terminate and return {RPSTs:: 1}=Ø (i.e., the empty set). Returning to the fifth recursive instance of process 1700, block 1714 updates {RPSTs:: child} to include {r} ({r}={1} for this particular case where tree 1200 is a BELT). Accordingly, {RPSTs:: 2}=push {1}={2} (using the edge label value j=0 as determined at block 1710 of the fifth recursive instance of process 1700 and shown in relation (7)). This corresponds with the RPST 2300 of child tree 2200 formed by node 1906, and either node 1908 or 1912 as shown in FIG. 27.

Returning to block 1812 of the first recursive instance of process 1800, {RPSTs:: 12} is updated as {2}. The remainder is updated to be the natural numeral remainder/ST=12/2=6. Block 1808 determines ST to be the smallest non-composite factor of the updated remainder (here, "6") to be "2." As illustrated above in the fifth recursive instance of process 1700, block 1810 determines {RPSTs:: 2} to be {2} (again, corresponding with the RPST of subtree 2200 formed by node 1906, and either node 1908 or 1912). Block 1812 may then determine combinations of the previously enumerated elements of {RPSTs:: 12} with the elements of {RPSTs:: ST} using the set merger operation of relation (4) and update {RPSTs:: 12} as follows:

$$\{RPSTs:: 12\} = \{RPSTs:: 12\} \cup \{RPSTs:: 2\} \cup [\{RPSTs:: 12\} \times \quad (8)$$
$$\{RPSTs:: 2\}]$$
$$= \{RPSTs:: 2\} \cup \{RPSTs:: 2\} \cup [\{RPSTs:: 2\} \times$$
$$\{RPSTs:: 2\}]$$
$$= \{2\} \cup \{2\} \cup [\{2\} \times \{2\}]$$
$$= \{2, 4\}$$

This updated {RPSTs:: 12} is graphically illustrated in FIG. 27 (illustrating the RPST 2300 of child tree 2200) and 28 (illustrating an RPST 2400 of subtree 2200 associated with the natural numeral 4).

Block 1814 then updates the remainder=remainder/ST=6/2=3, and the next iteration of the processing loop of blocks 1806 through 1816 determines ST as "3" at block 1808. Block 1810 may determine {RPSTs:: ST}={RPSTs:: 3}={3} as illustrated above in the first recursive instance of process 1700. This resulting RSPT of the child tree 2200 includes nodes 1906 and 1910 as shown in RPST 2500 of FIG. 29. Block 1812 then updates {RPSTs:: 12} (from {RPSTs:: 12}={2, 4} at relation (8)) as follows:

$$\{RPSTs:: 12\} = \{2, 4\} \cup \{3\} \cup [\{2, 4\} \times \{3\}] \quad (9)$$
$$= \{2, 3, 4\} \cup \{6, 12\} = \{2, 3, 4, 6, 12\}$$

Figure 30:
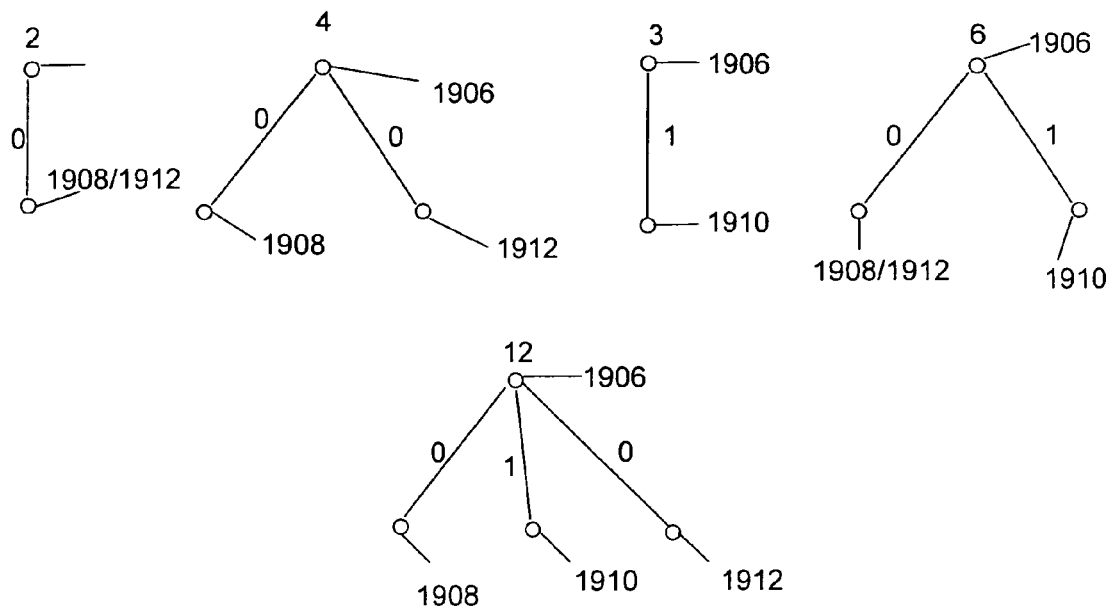

The resulting elements of {RPSTs:: 12} are graphically illustrated in FIG. 30 with corresponding nodes 1906, 1908, 1910 and 1912 of the child tree 2200 shown in FIG. 26. It should be noted that in the process of enumerating of elements of the set {RPSTs:: 12} at relations (8) and (9), duplicate RPSTs were enumerated for the RPST corresponding with numeral "4." Here, in listing the elements of the set {RPSTs:: 12} at relations (8) and (9) in this particular embodiment such a duplicate listing the RPST corresponding with the numeral "4" was not included so as to provide unique, unordered elements of the set {RPSTs:: 12}. However, this is merely a particular embodiment provided for illustration and claimed subject matter is not limited in this respect. For example, it should be readily appreciated that the process of enumerating RPSTs of a tree or subtree described herein may be readily applied alternative embodiments for enumerating RPSTs of a tree or subtree that includes such duplicated RPSTs. Again, this example of enumerating duplicate RPSTs is also merely an example provided for the purpose of illustration and claimed subject matter is not limited in this respect.

Returning to the third recursive instance of process 1700 (following the identification of 2200 as the child tree of RPST 2100 at block 1710 and the enumeration of the RPSTs of subtree 2200 as the elements of {RPSTs:: 12} in block 1712)), block 1714 updates {RPSTs:: child} to include {RPSTs:: 12} U {r}={1, 2, 3, 4, 6, 12}. Block 1716 may then complete the enumeration of the elements of {RPSTs:: 83} by performing a push operation on the elements of {RPSTs:: child} according to relation (2) (with label index value j=0 as determined in relation (6)) as follows:

$$\{RPSTs::83\}=zero\text{-}push(\{1,2,3,4,6,12\})=\{2,5,11,17, \quad (10)$$
$$31,83\}$$

The resulting elements of {RPSTs:: 83} are graphically illustrated with reference to FIG. 31 with corresponding nodes 1902, 1906, 1908, 1910 and 1912 of the subtree 2100 shown in FIG. 25.

Figure 31:
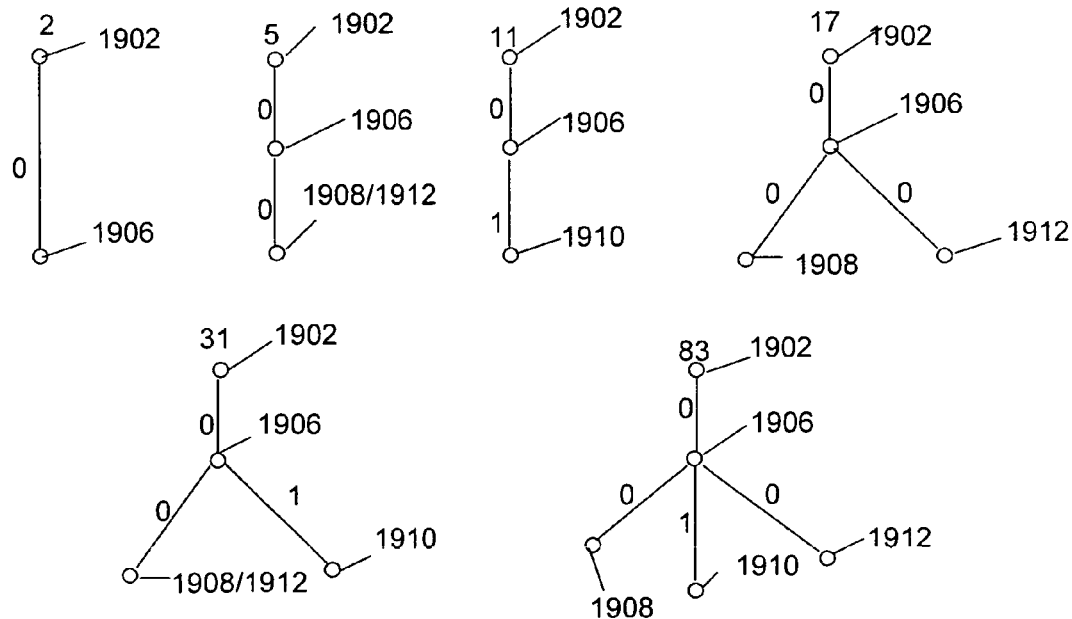

Returning to the initial instance of process 1800 (following the enumeration of elements in {RPSTs:: 3} corresponding with a first subtree merged at root node 1902 as graphically illustrated in FIG. 24 and the enumeration of elements in {RPSTs:: 83} corresponding with a second subtree merged at root node 1902 as graphically illustrated in FIG. 31), block 1812 updates {RPSTs:: FT} as follows:

$$\{RPSTs::\ FT\} = \{RPSTs::\ 3\} \cup \{RPSTs::\ 83\} \cup [\{RPSTs::\ 3\} \times \{RPSTs::\ 83\}] \quad (11)$$
$$= \{2, 3, 5, 11, 17, 31, 83\} \cup [\{3\} \times \{2, 5, 11, 17, 31, 83\}]$$
$$= \{2, 3, 5, 11, 17, 31, 83\} \cup \{6, 15, 33, 51, 93, 249\}$$
$$= \{2, 3, 5, 6, 11, 15, 17, 31, 33, 51, 33, 51, 83, 93, 249\}$$

While the above illustrated example is a specific case of enumerating RPSTs from one particular BELT (associated with the natural numeral 249), it should be understood that the processes are general enough to enumerate RPSTs for any tree. Also, while the illustrated example is specifically directed to enumerating RPSTs of a BELT, claimed subject matter is not limited to this specific example or specifically to BELTs.

It should also be understood that, although particular embodiments have just been described, claimed subject matter is not limited in scope to a particular embodiment or implementation. For example, one embodiment may be in hardware, such as implemented to operate on a device or combination of devices, for example, whereas another embodiment may be in software. Likewise, an embodiment may be implemented in firmware, or as any combination of hardware, software, and/or firmware, for example. Such software and/or firmware may be expressed as machine-readable instructions which are executable by a processor. Likewise, although claimed subject matter is not limited in scope in this respect, one embodiment may comprise one or more articles, such as a storage medium or storage media. This storage media, such as one or more CD-ROMs and/or disks, for example, may have stored thereon instructions, that when executed by a system, such as a computer system, computing platform, or other system, for example, may result in an embodiment of a method in accordance with claimed subject matter being executed, such as one of the embodiments previously described, for example. As one potential example, a computing platform may include one or more processing units or processors, one or more input/output devices, such as a display, a keyboard and/or a mouse, and/or one or more memories, such as static random access memory, dynamic random access memory, flash memory, and/or a hard drive, although, again, claimed subject matter is not limited in scope to this example.

In the preceding description, various aspects of claimed subject matter have been described. For purposes of explanation, specific numbers, systems and/or configurations were set forth to provide a thorough understanding of claimed subject matter. However, it should be apparent to one skilled in the art having the benefit of this disclosure that claimed subject matter may be practiced without the specific details. In other instances, well-known features were omitted and/or simplified so as not to obscure claimed subject matter. While certain features have been illustrated and/or described herein, many modifications, substitutions, changes and/or equivalents will now occur to those skilled in the art. It is, therefore, to be understood that the appended claims are intended to cover all such modifications and/or changes as fall within the true spirit of claimed subject matter.

The invention claimed is:

1. A method comprising:
    identifying partial subtrees of a tree, said tree comprising hierarchical data representing one or more XML documents, said partial subtrees having depths up to a predetermined depth defining a longest separation between a root node and terminal node of said partial subtrees;
    enumerating rooted partial subtrees of at least one of said identified partial subtrees;
    representing said tree as one or more electrical digital signals representing one or more target numerals, said one or more target numerals being associated with said enumerated rooted partial subtrees according to an association between trees and numerals;
    determining one or more signals representing a probe numeral representing a query to said one or more XML documents based, at least in part, on one or more electrical digital signals representing a probe tree, said probe tree comprising a piece of information of interest; and
    comparing, using a processor, said one or more electrical digital signals representing said probe numeral with said one or more signals representing said one or more target numerals to detect a presence of said piece of information in said tree by detecting a presence of said one or more signals representing said probe tree in one or more electrical digital signals representing said tree based, at least in part, on a match of said one or more signals representing said probe numeral with one or more electrical digital signals representing at least one of said target numerals.

2. The method of claim 1, wherein said probe numeral is based, at least in part, on said association of trees and numerals.

3. The method of claim 1, and further comprising:
    identifying non-terminal nodes of said tree as root nodes of said partial subtrees; and
    identifying one or more nodes descending from a root node of at least one of said partial subtrees to be one or more nodes of said partial subtree.

4. The method of claim 3, wherein said identifying one or more nodes descending from a root node of at least one of said partial subtrees further comprises identifying nodes descending from a root node of at least one of said partial subtrees down to said predetermined depth to be one or more nodes of said partial subtree.

5. The method of claim 3, wherein said identifying one or more nodes descending from a root node of at least one of said partial subtrees further comprises identifying one or more nodes descending from a root node of at least one of said partial subtrees based, at least in part, on electrical digital signals representing node and/or edge label values associated with said nodes.

6. The method of claim 1, and further comprising determining said one or more signals representing said probe numeral based, at least in part, on said association between trees and numerals, and wherein said match corresponds with a partial subtree of said tree matching said probe tree.

7. The method of claim 1, wherein said tree comprises a binary edge labeled tree.

8. The method of claim 1, wherein said tree comprises hierarchical data representative of a known biometric pattern and said probe numeral is representative of one or more features of a subject and/or specimen.

9. The method of claim 1, and further comprising further executing said instructions by said processor to:

determine target numerals associated with enumerated rooted partial subtrees having a root node with at least two nodes directly descending nodes as composite natural numerals; and determine target numerals associated with enumerated rooted partial subtrees having a root node with a single directly descend nodes as non-composite natural numerals.

10. A method comprising:

representing a tree as one or more electrical digital signals representing one or more target numerals, said one or more target numerals being associated with partial subtrees of said tree according to an association between trees and numerals, said partial subtrees having depths up to a predetermined depth defining a longest separation between a root node and terminal node of said partial subtrees;

determining one or more signals representing a probe numeral based, at least in part, on one or more electrical digital signals representing a probe tree, said probe tree comprising a piece of information of interest; and comparing, using a processor, said one or more signals representing said probe numeral with said one or more signals representing said one or more target numerals to detect a presence of said piece of information in said tree by detecting a presence of said one or more signals representing said probe tree in one or more electrical digital signals representing said tree based, at least in part, on a match of said one or more signals representing said probe numeral with one or more electrical digital signals representing at least one of said target numerals, wherein said tree comprises hierarchical data representative of a known biometric pattern and said probe numeral is representative of one or more features of a subject and/or specimen.

11. An apparatus comprising:

means, comprising one or more processors, for identifying subtrees of a tree, said tree comprising hierarchical data representing one or more XML documents, said subtrees having depths up to a predetermined depth defining a longest separation between a root node and terminal node of said subtrees;

means, comprising said one or more processors, for enumerating rooted partial subtrees of at least one of said identified subtrees;

means, comprising said one or more processors, for representing said tree as one or more target numerals, said one or more target numerals being associated with said enumerated rooted partial subtrees according to an association of trees and numerals;

means, comprising said one or more processors, for determining a probe numeral representing a query to said one or more XML documents based, at least in part, on a probe tree, said probe tree comprising a piece of information of interest; and means, comprising said one or more processors, for comparing said probe numeral with said one or more target numerals to detect a presence of said piece of information in said tree by detecting a presence of said probe tree in said tree based, at least in part, on a match of said probe numeral with at least one of said target numerals.

12. The apparatus of claim 11, wherein said probe numeral is based, at least in part, on said association of trees and numerals.

13. The apparatus of claim 11, wherein said means for identifying said partial subtrees of said tree further comprises:

means for identifying non-terminal nodes of said tree as root nodes of said partial subtrees; and means for identifying one or more nodes descending from a root node of at least one of said partial subtrees to be one or more nodes of said partial subtree.

14. The apparatus of claim 13, wherein said means for identifying one or more nodes descending from a root node of at least one of said partial subtrees further comprises means for identifying one or more nodes descending from a root node of at least one of said partial subtrees down to a predetermined depth to be one or more nodes of said partial subtree.

15. The apparatus of claim 13, wherein said means for identifying one or more nodes descending from a root node of at least one of said partial subtrees further comprises means for identifying nodes descending from a root node of at least one of said partial subtrees based, at least in part, on node and/or edge label values associated with said nodes.

16. The apparatus of claim 11, and further comprising means for determining said probe numeral based, at least in part, on said association between trees and numerals, and wherein said match corresponds with a partial subtree of said tree matching said probe tree.

17. The apparatus of claim 11, wherein said tree comprises a binary edge labeled tree.

18. The apparatus of claim 11, and further comprising means for representing hierarchical data representative of a known biometric pattern as said tree and representing one or more features of a subject and/or specimen as said probe numeral.

19. An apparatus comprising:

means, comprising one or more processors, for representing a tree as one or more target numerals, said one or more target numerals being associated with partial subtrees of said tree according to an association between trees and numerals, said partial subtrees having depths up to a predetermined depth defining a longest separation between a root node and terminal node of said partial subtrees;

means, comprising said one or more processors, for determining a probe numeral based, at least in part, on one or more electrical digital signals representing a probe tree, said probe tree comprising a piece of information of interest;

means, comprising one or more processors, for comparing said probe numeral with said one or more target numerals to detect a presence of said piece of information in said tree by detecting a presence of said probe tree in said tree based, at least in part, on a match of said probe numeral with at least one of said target numerals; and means, comprising one or more processors, for representing hierarchical data representative of a known biometric pattern as said tree and representing one or more features of a subject and/or specimen as said probe numeral.

20. An article comprising:

a storage medium comprising machine-readable instructions stored thereon which are executable by a processor to:

identify subtrees of a tree, said tree comprising hierarchical data representing one or more XML documents, said subtrees having depths up to a predetermined depth defining a longest separation between a root node and terminal node of said subtrees;

enumerate rooted partial subtrees of at least one of said identified subtrees;

represent said tree as one or more target numerals, said one or more target numerals being associated with said enumerated rooted partial subtrees according to an association between trees and numerals;

determine a probe numeral representative of a query to said one or more XML documents based, at least in part, on a probe tree, said probe tree comprising a piece of information of interest; and compare said probe numeral with said one or more target numerals to detect a presence of said piece of information in said tree by detecting a presence of said probe tree in said tree based, at least in part, on a match of said probe numeral with at least one of said target numerals.

21. The article of claim 20, wherein said machine-readable instructions are further executable by said processor to generate said one or more target numerals based, at least in part, on one or more numerals representing rooted partial subtrees of at least one of said partial subtrees.

22. The article of claim 20, wherein said machine-readable instructions are further executable by said processor to determine said probe numeral based, at least in part, on said association between trees and numerals.

23. The article of claim 20, wherein said instructions are further executable by said processor to:
identify non-terminal nodes of said tree as root nodes of said partial subtrees; and
identify one or more nodes descending from a root node of at least one of said partial subtrees to be one or more nodes of said partial subtree.

24. The article of claim 23, wherein said instructions are further executable by said processor to identify one or more nodes descending from a root node of at least one of said partial subtrees down to said predetermined depth to be one or more nodes of said partial subtree.

25. The article of claim 23, wherein said instructions are further executable by said processor to identify one or more nodes descending from a root node of at least one of said partial subtrees to be one or more nodes of said partial subtree based, at least in part, on node and/or edge label values associated with said one or more nodes.

26. The article of claim 20, wherein said instructions are further executable by said processor to determine said probe numeral based, at least in part, on said association between trees and numerals, and wherein said match corresponds with a partial subtree of said tree matching said probe tree.

27. The article of claim 20, wherein said tree comprises a binary edge labeled tree.

28. The article of claim 20, wherein said instructions are further executable by said processor to represent hierarchical data representative of a known biometric pattern as said tree and represent one or more features of a subject and/or specimen as said probe numeral.

29. An article comprising:
a storage medium comprising machine-readable instructions stored thereon which are executable by a processor to:
represent a tree as one or more target numerals, said one or more target numerals being associated with identified partial subtrees of said tree according to an association between trees and numerals, said identified partial subtrees having depths up to a predetermined depth defining a longest separation between a root node and a terminal node of said partial subtrees;
determine a probe numeral based, at least in part, on a probe tree, said probe tree comprising a piece of information of interest;
compare said probe numeral with said one or more target numerals to detect a presence of said piece of information in said tree by detecting a presence of said probe tree in said tree based, at least in part, on a match of said probe numeral with at least one of said target numerals; and
represent hierarchical data representative of a known biometric pattern as said tree and represent one or more features of a subject and/or specimen as said probe numeral.

30. An apparatus comprising:
a computing platform comprising one or more processors programmed with instructions to:
identify subtrees of a tree, said tree comprising hierarchical data representing one or more XML documents, said subtrees having depths up to a predetermined depth defining a longest separation between a root node and a terminal node of said subtrees;
enumerate rooted partial subtrees of at least one of said identified subtrees;
represent said tree as one or more electrical digital signals representing one or more target numerals, said one or more target numerals being associated with said enumerated rooted partial subtrees according to an association between trees and numerals;
determine a probe numeral representative of a query to said one or more XML documents based, at least in part, said probe tree comprising a piece of information of interest; and
compare one or more electrical digital signals representing said probe numeral with said one or more signals representing said one or more target numerals to detect a presence of said piece of information in said tree by detecting a presence of said probe tree in said tree based, at least in part, on a match of said probe numeral with at least one of said target numerals.

31. The apparatus of claim 30, wherein said one or more processors are further programmed with instructions to determine said one or more signals representing said probe numeral based, at least in part, on an association of trees and numerals.

32. The apparatus of claim 30, wherein said one or more processors are further programmed with instructions to:
identify said one or more partial subtrees of said tree; and
determine said one or more signals representing said one or more target numerals based, at least in part, on at least a portion of said partial subtrees and according to said association between trees and numerals.

33. The apparatus of claim 30, wherein said one or more processors are further programmed with instructions to:
identify non-terminal nodes of said tree as root nodes of said partial subtrees; and
identify one or more nodes descending from a root node of at least one of said partial subtrees to be one or more nodes of said partial subtree.

34. The apparatus of claim 33, wherein said one or more processors are further programmed with instructions to identify one or more nodes descending from a root node of at least one of said partial subtrees down to said predetermined depth to be one or more nodes of said partial subtree.

35. The apparatus of claim 33, wherein said one or more processors are further programmed with instructions to identify one or more nodes descending from a root node of at least one of said partial subtrees to be one or more nodes of said partial subtree based, at least in part, on one or more electrical digital signals representing node and/or edge label values associated with said one or more nodes.

36. The apparatus of claim 30, wherein said one or more processors are further adapted to determine said one or more signals representing said probe numeral based, at least in part, on said association between trees and numerals, and wherein said match corresponds with a partial subtree of said tree matching said probe tree.

37. The apparatus of claim 30, wherein said tree comprises a binary edge labeled tree.

38. The apparatus of claim 30, wherein said one or more processors are further programmed with instructions to represent hierarchical data representative of a known biometric pattern as said tree and represent one or more features of a subject and/or specimen as said one or more signals representing said probe numeral.

39. An apparatus comprising:
a computing platform comprising one or more processors programmed with instructions to:
represent a tree as one or more electrical digital signals representing one or more target numerals, said one or more target numerals being associated with identified partial subtrees of said tree according to an association between trees and numerals, said partial subtrees having depths up to a predetermined depth defining a longest separation between a root node and a terminal node of said partial subtrees;

determine one or more signals representing a probe numeral based, at least in part, on one or more electrical digital signals representing a probe tree, said probe tree comprising a piece of information of interest;

compare one or more electrical digital signals representing said probe numeral with said one or more signals representing said one or more target numerals to detect a presence of said piece of information in said tree by detecting a presence of said one or more signals representing said probe tree in one or more electrical digital signals representing said tree based, at least in part, on a match of said one or more signals representing said probe numeral with one or more electrical digital signals representing at least one of said target numerals; and represent hierarchical data representative of a known biometric pattern as said tree and represent one or more features of a subject and/or specimen as said one or more signals representing said probe numeral.

* * * * *